US006823423B1

(12) United States Patent
Katsetos et al.

(10) Patent No.: US 6,823,423 B1
(45) Date of Patent: Nov. 23, 2004

(54) METHODS FOR INTERFACING COMPONENTS AND FOR WRITING AND READING A SERIAL DATA STREAM TO AND FROM A COMPONENT ASSOCIATED WITH A PARALLEL DATA STREAM

(75) Inventors: Chris M. Katsetos, Middletown, OH (US); Jeffrey J. Noe, Cincinnati, OH (US); Russell F. Batterson, Loveland, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 786 days.

(21) Appl. No.: 09/586,145

(22) Filed: Jun. 2, 2000

Related U.S. Application Data

(60) Provisional application No. 60/138,080, filed on Jun. 8, 1999.

(51) Int. Cl.[7] .............................................. G06F 12/00
(52) U.S. Cl. ........................... 711/112; 710/36; 710/62; 710/74
(58) Field of Search ................................ 711/112, 113; 710/36, 62, 74

(56) References Cited

U.S. PATENT DOCUMENTS

| | | | | |
|---|---|---|---|---|
| 4,802,152 A | * | 1/1989 | Markvoort et al. | 369/30.22 |
| 5,133,060 A | * | 7/1992 | Weber et al. | 711/113 |
| 5,247,633 A | * | 9/1993 | Nissimov et al. | 711/4 |
| 5,544,334 A | * | 8/1996 | Noll | 710/100 |
| 5,661,848 A | * | 8/1997 | Bonke et al. | 711/112 |
| 5,991,194 A | * | 11/1999 | Jigour et al. | 365/185.04 |
| 6,040,792 A | * | 3/2000 | Watson et al. | 341/100 |
| 6,119,195 A | * | 9/2000 | Ellis et al. | 710/62 |
| 6,199,122 B1 | * | 3/2001 | Kobayashi | 710/36 |
| 6,505,267 B2 | * | 1/2003 | Luke et al. | 710/62 |
| 6,546,438 B1 | * | 4/2003 | Katsetos et al. | 710/36 |

FOREIGN PATENT DOCUMENTS

JP          11-212899    *    8/1999

* cited by examiner

*Primary Examiner*—Donald Sparks
*Assistant Examiner*—Christian P. Chace

(57) ABSTRACT

A method for interfacing components includes receiving a request for an access operation, and determining whether data corresponding to a requested data address is missing from memory, such as cache. Data may be converted from a first communication type to a second communication type and written to the memory and to a second one of the components during a write operation, and converted from the second communication type to a first communication type and read by the first component during a read operation. The components may be an integrated device electronics (IDE) hard disk drive and a system or controller originally designed to communicate with a modified frequency modulation (MFM) hard disk drive. Handshaking signals such as index and seek-complete signals allow the interface module to emulate operation of an MFM hard disk drive. Method for writing and reading a serial data stream to and from a component associated with a parallel data stream are also described.

11 Claims, 19 Drawing Sheets

METHODS FOR INTERFACING COMPONENTS AND FOR WRITING AND READING A SERIAL DATA STREAM TO AND FROM A COMPONENT ASSOCIATED WITH A PARALLEL DATA STREAM

This application claims the benefit of U.S. Provisional Application No. 60/138,080, filed Jun. 8, 1999.

TECHNICAL FIELD

This invention relates generally to the field of interfacing components and, more particularly, to an intelligent module for interfacing an integrated device electronics (IDE) hard disk drive with a modified frequency modulation (MFM)-based control system.

BACKGROUND OF INVENTION

In the mid-1980's, hard disk drives (herein-after referred to as hard disks) often utilized electrical interfaces compliant with the Institute of Electrical and Electronics Engineers (IEEE) 412 standard. Such hard disks are often referred to as "dumb" devices, as they must be told what to do and when to do it (e.g., by a controller). In such a system, physical media is remote from controller electronics, meaning the interface break lies between the mechanical portion of the drive (i.e., the magnetic media, stepper motors, heads, etc.) and the controller electronics.

With hard disks adhering to this standard, signals are transferred from a controller to the hard disk over two separate sets of conductors: a control cable and a data cable. The control cable contains all the necessary signals to select the correct drive, cylinder, and head, as well as status signals from the drive notifying the controller of the location of the sector, index, track 0, drive readiness, etc. Meanwhile, the data cable is used for transmitting differential read and write lines.

Among other schemes, devices adhering to the IEEE 412 standard employed a bit encoding scheme known as Modified Frequency Modulation ("MFM") to store data onto media. In the early 1990's, however, with the development of the Advanced Technology Attachment ("ATA") disk drive interface standard (commonly known as the Integrated Device Electronics ("IDE") interface), IEEE 412 technology became obsolete. Thus, advancements in and production of IEEE 412 components, such as MFM hard disks, curtailed, and replacement parts for these components have become increasingly hard to find.

In contrast to "dumb" devices, such as MFM hard disks, the controller electronics of an IDE hard disk are moved out with the mechanical portion of the drive, thus changing the drive interface from being between the media and the controller, to being between the controller and the host processor. Therefore, the interfaces for each of these drives are considerably different.

When viewed from an interfacing standpoint, the differences between the two technologies have heretofore made replacing an IEEE 412 component with an IDE component difficult. For example, due to hardware and software constraints, interfacing an IDE hard disk with control systems designed to interface with an MFM hard drive has not been simple or practical for most users. Accordingly, it would be advantageous to provide an apparatus and method that would allow users of IEEE 412 control systems to interface with IDE components, such as IDE hard drives.

SUMMARY OF THE INVENTION

It is one object of this invention to provide an IEEE 412 to IDE interface.

It is another object of this invention to provide a simple module capable of interfacing IDE components in systems utilizing an IEEE 412 interface, without the need to change the configuration or the software of the system.

Still another object of the present invention is to provide an intelligent module capable of interfacing with the system while remaining transparent to the system.

Yet another object of this invention is to provide an interface module capable of emulating an interface to an MFM hard disk(i.e., a spinning disk with heads floating over a media surface, a stepper motor cylinder selection, and head and drive selects) when using an IDE hard drive.

According to one embodiment of the present invention, a method for interfacing components is provided. The steps of the method include receiving from a first component a request for an access operation comprising one of at least a write operation and a read operation, the request comprising a requested data address associated with a second component, and determining whether data corresponding to the requested data address is missing from memory, the memory being independent of the second component. When the data is missing from the memory, the method includes the steps of intercepting the request, loading the data from the second component to the memory, and performing the requested access operation. According to such an embodiment, modified data is converted from a first communication type to a second communication type and written to the memory and to the second component during a write operation, and data is converted from the second communication type to the first communication type and read by the first component during a read operation.

In another embodiment of the present invention, a method for writing a serial data stream to a component associated with parallel data streams is provided. This method includes the steps of receiving a serial data stream, converting the serial data stream to a parallel data stream, loading the parallel data stream in memory, and writing the parallel data stream from the memory to a component. Yet another embodiment of the present invention is directed towards a method for reading a serial data stream from a component associated with parallel data streams. The method according to this embodiment includes the steps of receiving a request for data associated with the component, receiving a parallel data stream from memory in response to the request for the data, converting the parallel data stream to a serial data stream, and outputting the serial data stream.

Still other aspects of the present invention will become apparent to those skilled in this art from the following description wherein there is shown and described various embodiments of this invention, simply by way of illustration. As will be realized, the invention is capable of other different aspects and embodiments without departing from the scope of the invention. Accordingly, these exemplary objects are not intended to, nor do they, limit the scope of the present invention in any way, and the drawings and descriptions should be regarded as illustrative in nature and not as restrictive in nature. Further preferred embodiments of the present invention involve a computer readable medium including instructions capable of performing the steps of the various methods of the present invention.

BRIEF DESCRIPTION OF THE DRAWINGS

While the specification concludes with claims particularly pointing out and distinctly claiming the invention, it is believed the same will be better understood from the following description taken in connection with the accompanying drawings in which:

DETAILED DESCRIPTION OF EXEMPLARY EMBODIMENTS

Figure 1:
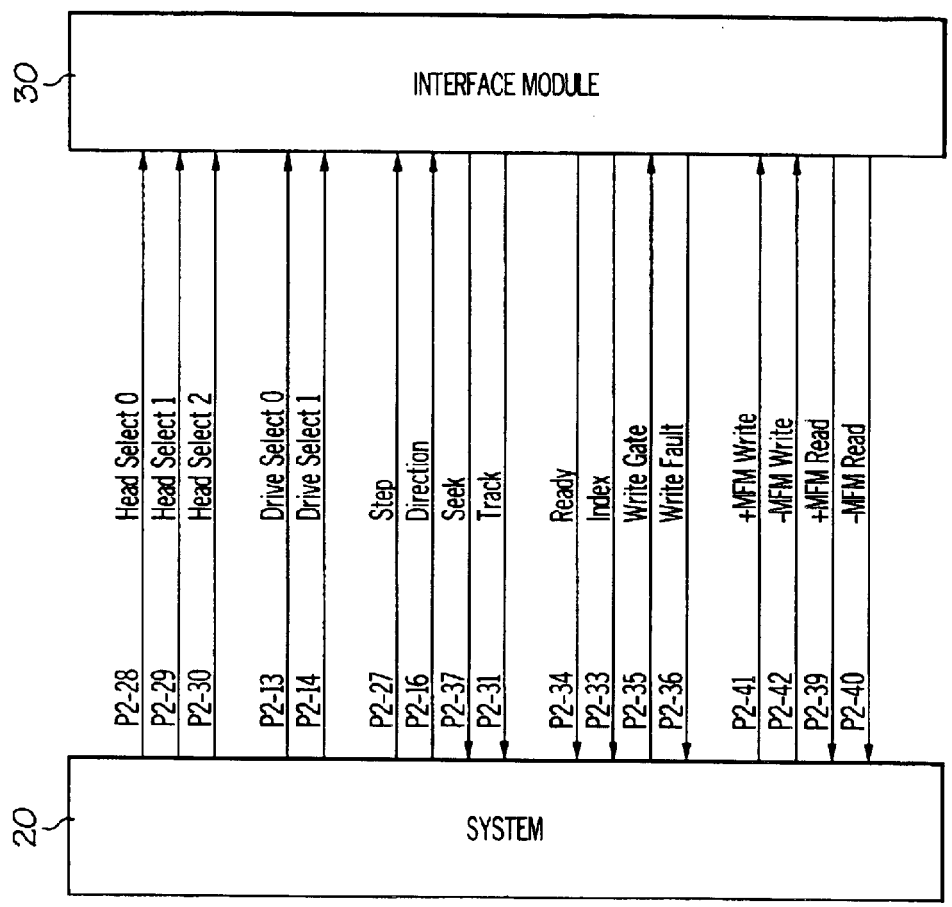
FIG. 1 is a representation of an interface to an IEEE 412 system according to a first embodiment of the present invention.
Figure 2:
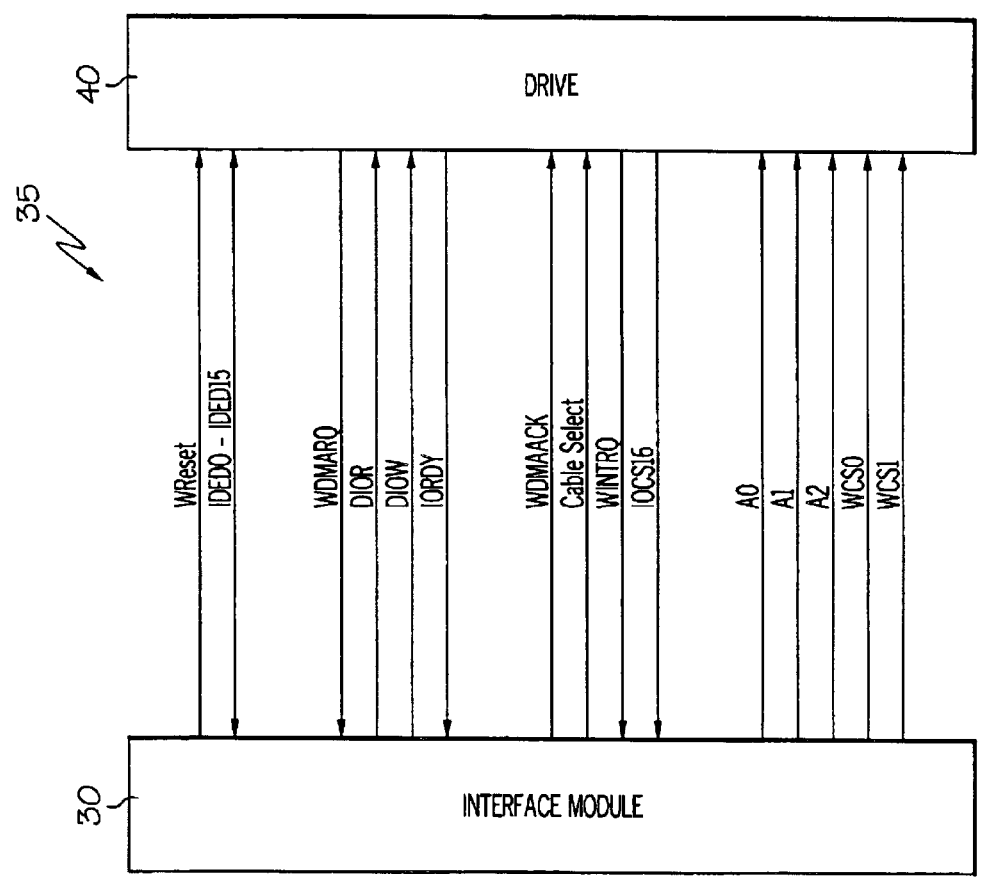
FIG. 2 is a representation of an interface to an IDE hard disk.

Referring now to the drawings in detail, wherein like numerals indicate the same elements throughout the views, FIGS. 1 and 2 depict an interface between system 20 and interface module 30, and interface module 30 and drive 40 (shown collectively in FIG. 2 as drive module 35), respectively, according to an exemplary embodiment of the present invention, which utilizes an MFM-based controller and an IDE hard drive. According to the exemplary embodiment illustrated herein, to system 20, interface module 30 emulates an interface of an MFM drive (i.e., it appears as/emulates physical media—e.g., a literal spinning disk with heads floating over a media surface, with stepper motor, cylinder selection, and head and drive selects—to the system). Furthermore, according to such an embodiment, all relevant data and control lines of system 20 can be handled by interface module 30.

For example, in the illustrated embodiment, interface module 30 generates and/or simulates the following handshake signals, which are illustrated in FIG. 1: seek; track; ready; index; write fault; and MFM read data (represented in the figures as +MFM read and −MFM read). The seek handshake signal can be used to simulate when read-write heads of a drive are in position and have settled after stepping. This is also referred to as the seek complete pulse signal line. In one embodiment, this line is asserted low.

The track handshake signal can be used to simulate when heads have moved out of track 1 and into track 0 during power on. This is also an active low signal according to the illustrated embodiment. Meanwhile, the ready handshake signal can be used to simulate when a drive is up to speed, power is adequate, and the track signal is not asserted. As with the other signals discussed thus far, this can also be an active low signal.

The index handshake signal can be used to simulate, such as by high to low transition, when an index mark has passed under a read-write head. Accordingly, this can occur once per each simulated revolution. In addition, the write fault handshake signal can be asserted when an error has occurred during a write operation. This can also be an active low signal. As for data lines, the read data generated by interface module 30 can be outputted on differential data lines, such as +MFM read and −MFM read, as shown in FIG. 1.

With respect to inputs received from system 20, interface module 30 can accept the following signals: head select 0, head select 1, head select 2; drive select 0, drive select 1; step; direction; write gate, and MFM write data. The three head selects associated with an exemplary embodiment of the present invention are used to form a binary number that can be used to specify one of, for example, eight simulated heads that are to be active on the next read or write operation. Meanwhile, the drive select lines can be used to specify, for example, a drive that system 20 needs to access. Referring now to the step signal, this input can be used to trigger a motor (of an MFM drive) to step read/write heads one track in the direction determined by the state of the direction input.

With respect to the direction input, this signal can be used to indicate the direction heads are to move. For example, when the line is set low, the input can represent when the heads are to move towards a spindle hub (inside tracks), while when the line is set high, the input signal indicates that the heads are to move toward the outer tracks. In addition, the write gate input can be used to indicate whether a write operation or a read operation is to be performed. For example, an active low signal can be asserted low for a write operation, and asserted high for a read operation. Finally, with respect to data input, two differential data lines, +MFM write and −MFM write can be used to transmit MFM data.

Referring now to FIG. 2, interface module 30 accepts the following signals from drive 40: WDMARQ; WINTRQ; IORDY; and IOCS16. According to such an exemplary embodiment, the WDMARQ input represents a direct memory access ("DMA") request, while the WINTRQ input represents an interrupt asserted when drive 40 has completed a requested operation. The IORDY input can be asserted active low when drive 40 is not ready to respond to a data transfer request. Meanwhile, the IOCS16 can be an open-collector output signal. It can be used to indicate that a 16-bit data port has been addressed and that drive 40 is ready to send or receive a 16-bit word.

With respect to outputs, interface module 30 can generate and/or simulate the following signals: IDED0–IDED15; A0, A1, A2; DIOW; DIOR; WDMAACK; WRESET; WCS0; WCS1; and CABLE SELECT. IDED0–IDED15 can be an 8/16 bit bidirectional data bus, where IDED0–IDED7 can be used for 8-bit transfers, such as registers and error correction codes (ECCs). A0, A1, A2 can be a 3-bit, binary-coded address bus that is used to access a register for a data port of drive 40. The DIOW signal can be used to provide a clock for data transfers from a data bus to a register or to a data port of drive 40, such as by a rising edge of the strobe. Meanwhile, DIOR can be used to provide a clock for data transfers from a register or a data port of drive 40 to a data bus, such as a data bus of interface module 30. A rising edge of this signal can be used to latch data at interface module 30.

The WDMAACK signal can be used to represent a DMA acknowledge. The WRESET can be a drive reset signal, while CABLE SELECT is a signal that can allow drive 40 to be configured as drive 0 (e.g., when low) and drive 1 (e.g., when high). Finally, the WCS0 and WCS1 signals can be used as chip select signals that can select accessible command block registers.

Figure 3:
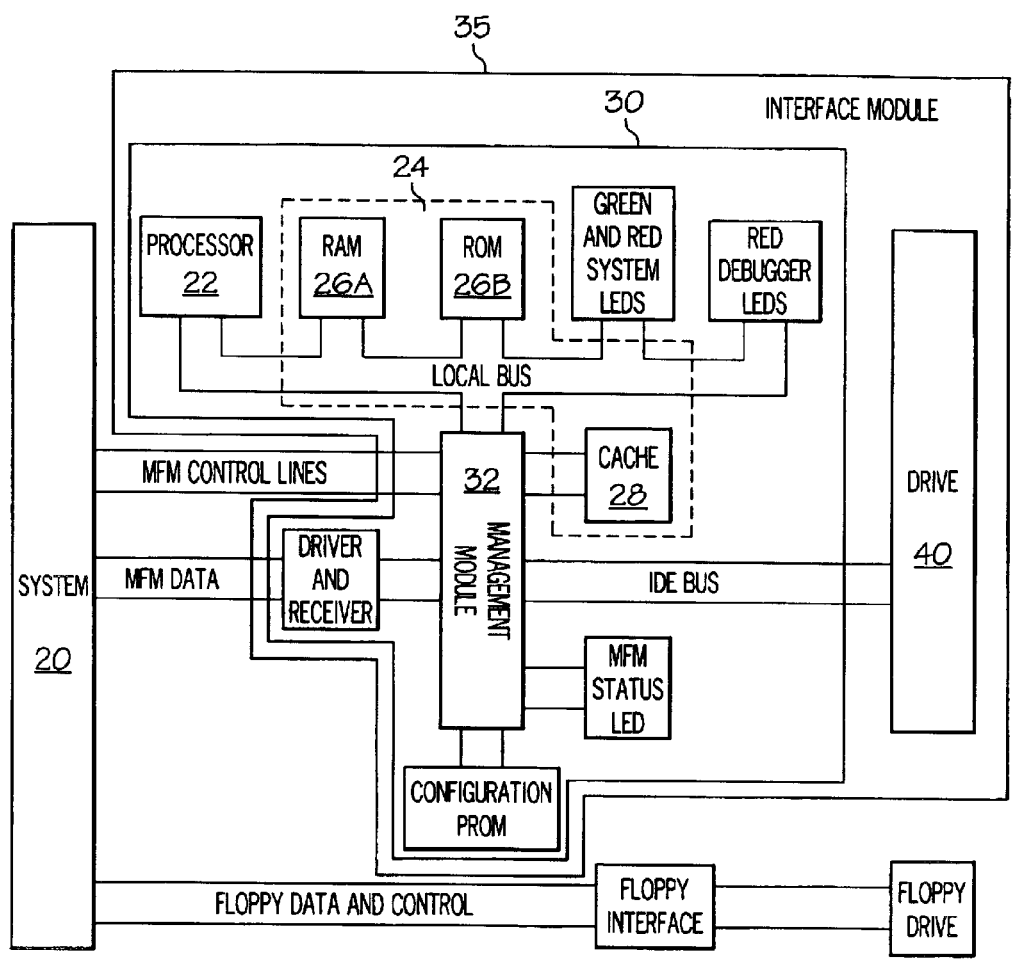
FIG. 3 is a schematic view of a system and component using an interface according to one embodiment of the present invention.

FIG. 3 depicts a schematic diagram of a control system 20 utilizing an interface module 30 according to one embodiment of the present invention. According to this embodiment, interface module 30 allows system 20 to communicate with an IDE component, such as IDE hard disk 40. Such an embodiment can allow for the intelligent transfer of data between, for example, an IDE hard disk and an MFM controller.

Although interface module 30 can be formed from software, it is formed from hardware in the illustrated embodiment. For example, according to an exemplary embodiment of the present invention, interface module 30 can comprise a processor 22, memory 24, and a management module 32. Interface module 30 can autonomously fetch and/or store a data stream from/to memory 24 without processor intervention.

Among other tasks, processor 22 can fetch, decode, and/or execute instructions, and/or transfer information to and from other resources, such as memory 24, and/or management module 32, such as by way of a bus. Furthermore, processor 22 can comprise an on-board microprocessor. For example, processor 22 can comprise an Intel® 80C186XL running at 25 megahertz (MHZ).

Memory 24 can comprise local random access memory ("RAM") 26A, read-only memory ("ROM") 26B, and cache memory 28. For example, local RAM 26A can be used for local stack, local data, scratch pad area, and/or interrupt vector table storage. Meanwhile, ROM 26B can contain an operating program associated with interface module 30, as well as any start-up and diagnostic codes. With respect to cache 28, before system 20 accesses data associated with drive 40, the data should be present in the cache. Accordingly, cache 28 can act like a buffer.

Figure 4:
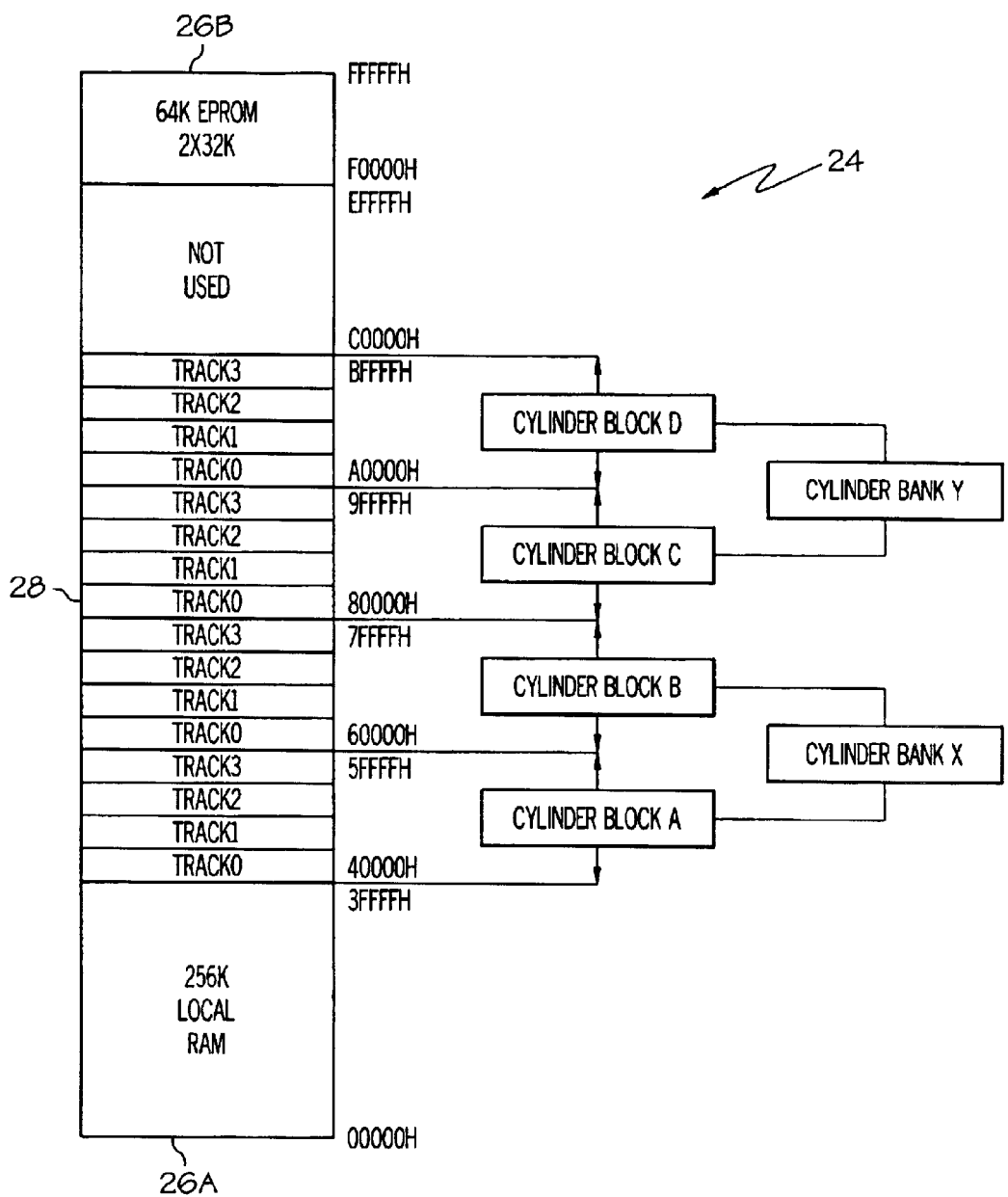
FIG. 4 is a memory map of an interface module according to one embodiment of the present invention.

Referring now to FIG. 4, according to one embodiment of the present invention, local RAM 26A comprises two 128K×8 static RAM ("SRAM") chips, addressed in the illustrated embodiment at the beginning of the address range of processor 22 (e.g., 0–3FFFFh). Meanwhile, ROM 26B can comprise a 64K upper block of programmable read-only memory ("PROM"), which can be erasable (i.e., an "EPROM"). EPROM or ROM 26B can, for example, comprise two 27C256 chips, providing 64K bytes of ROM that is addressed in the upper 64K block (e.g., F0000h–FFFFFh) of the address range of processor 22.

According to an exemplary embodiment of the present invention, cache 28 comprises cylinder RAM that is divided into blocks (e.g., four 128K byte blocks, respectively labeled A, B, C, D). Reference numeral 28 may be referred to hereafter as cache 28 or cylinder RAM 28. Within each block, cylinder RAM 28 can be segmented into pages (e.g., four pages), where each page can hold the equivalent of one track of data (e.g., 32K for MFM data). In one embodiment, at least an entire track is loaded into cylinder RAM 28 so that, once the seek signal is released, an entire emulated "rotation" of the media can be continuously presented to system 20. Although, in an exemplary embodiment, cylinder block A is used for cylinder 0 data, which typically stores a software chunk table, and cylinder blocks B, C, and D hold the data of the last three cylinders requested by system 20, all of the cylinder blocks could also be freely cached.

Storing data corresponding to four cylinders of drive 40 in cache 28 can, for example, allow for efficient use of disk caching, which can reduce the number of accesses to the drive. For example, as will be discussed below, during a read operation requested by system 20, data cached in cylinder RAM 28 can be read from the cylinder RAM with no accesses to drive 40. In one embodiment, accesses to drive 40 will only be required if the requested cylinder data is not in cylinder RAM 28 (i.e., a cache "miss") or if a write to the drive is required.

Figure 5:
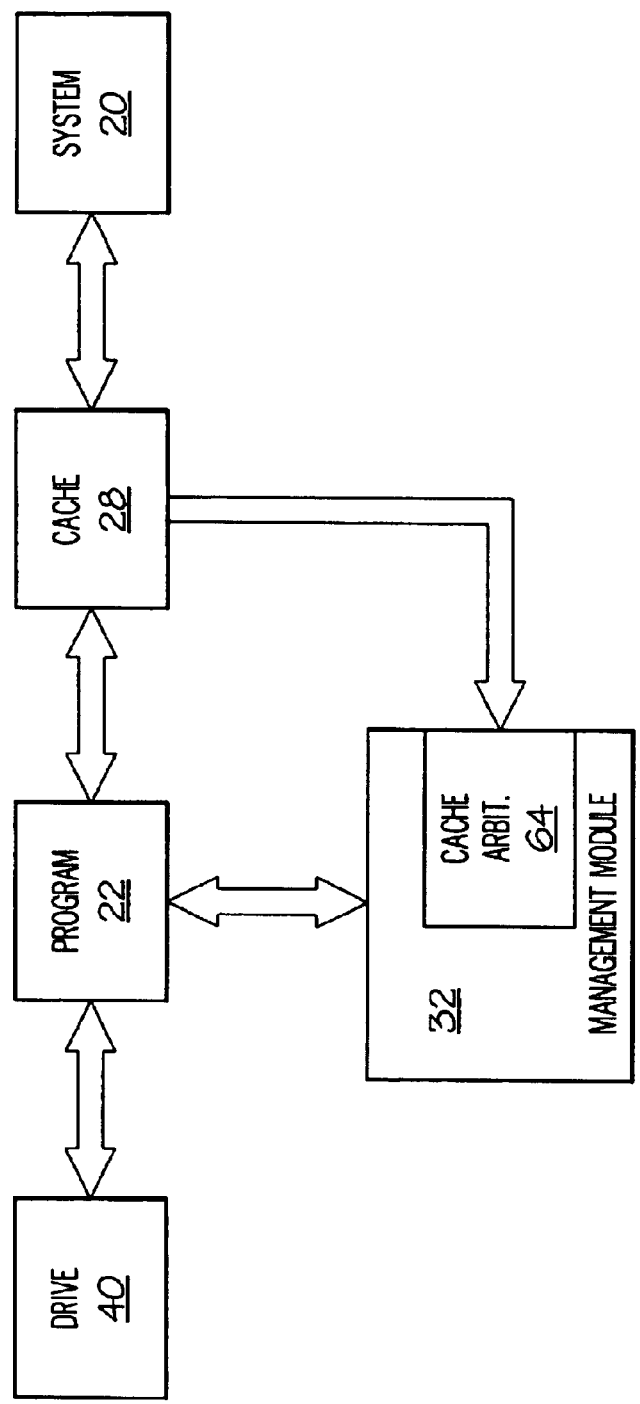
FIG. 5 is a diagram of the cache architecture of an interface module according to one embodiment of the present invention.

Referring now to FIG. 5, a simplified diagram of the architecture of cache 28, according to one embodiment of interface module 30, is shown. According to an exemplary embodiment of the present invention, after system 20 has issued a cylinder seek (e.g., issuing a series of head step pulses while drive 40 is selected), comparators (see below for discussion regarding cylinder RAM arbitration blocks 58 and 62 in FIG. 9) can be used to determine if the requested cylinder address is present in cylinder RAM 28 (i.e., a cache "hit"). In the instance of a cache hit, according to one embodiment, system 20 does not have to wait for processor 22 to fetch the requested track as the system is granted immediate access to the data already found in cache 28.

Meanwhile, if there is a cache miss, management module 32 can generate an update cache interrupt (see also discussion below regarding cylinder RAM arbitration blocks 58 and 62 in FIG. 9) that is communicated to processor 22, such as by way of interrupt request line INT0, which initiates a first interrupt subroutine, such as that depicted in FIG. 6. In general, with the initiation of the first subroutine, processor 22 can detain system 20, such as by causing the de-assertion of "seek-complete" (a handshake signal used to "hold off" the system and interface module 30 during lengthy emulation tasks), until the requested cylinder data can be loaded from drive 40 to cylinder RAM 28, for example. Cache arbitration block 64 can be used to keep track of data in cylinder RAM 28.

After receiving the update cache interrupt at INT0, processor 22 can read the requested cylinder address from a requested cylinder latch or port associated with management module 32. Once the requested cylinder address is determined, processor 22 causes the requested cylinder data to be read from drive 40 to cylinder RAM 28. According to such an embodiment, the seek-complete control line can then be released.

Figure 6A:
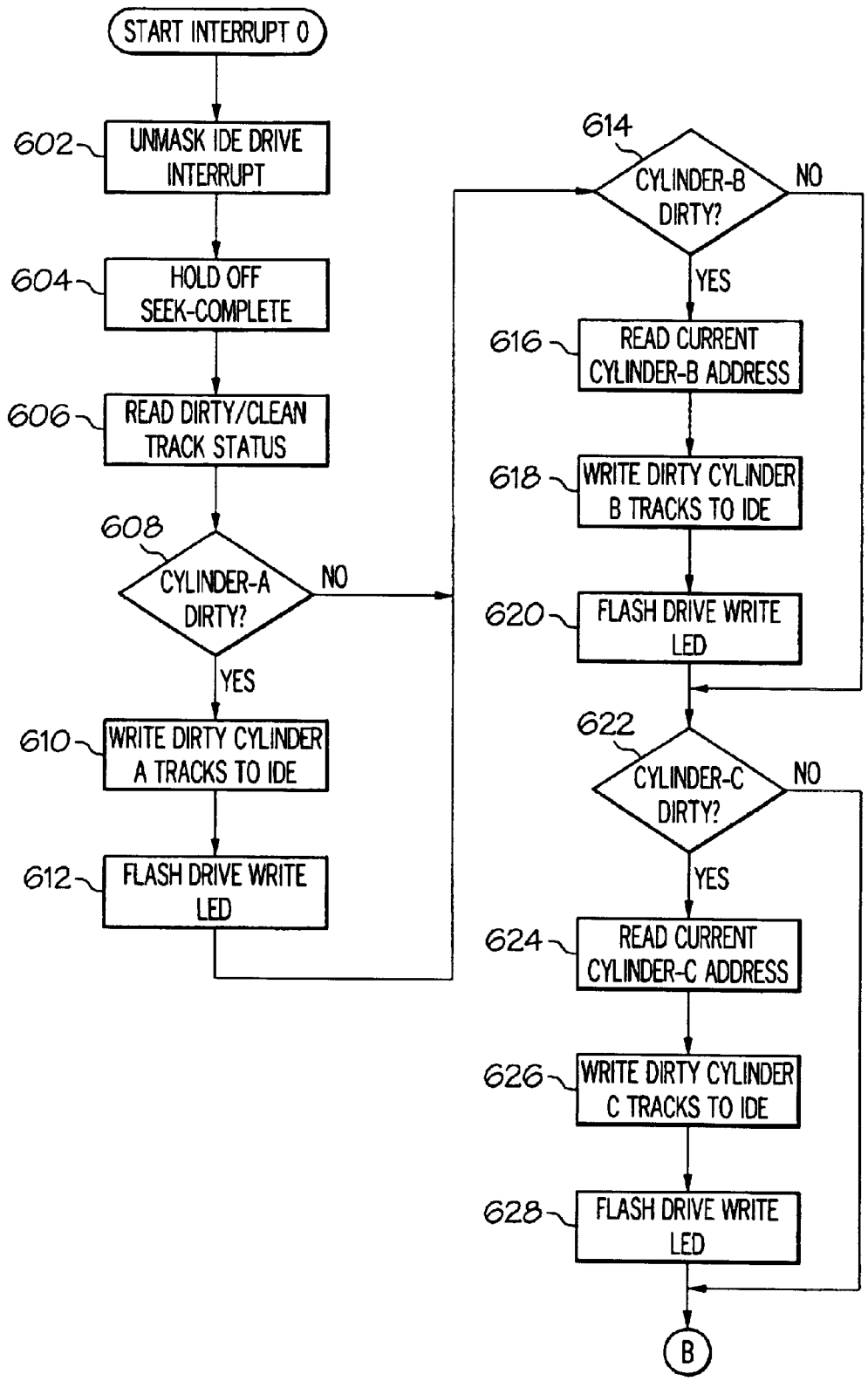
FIGS. 6A–6C illustrate a flowchart describing an interrupt subroutine according to one embodiment of the present invention.
Figure 6B:
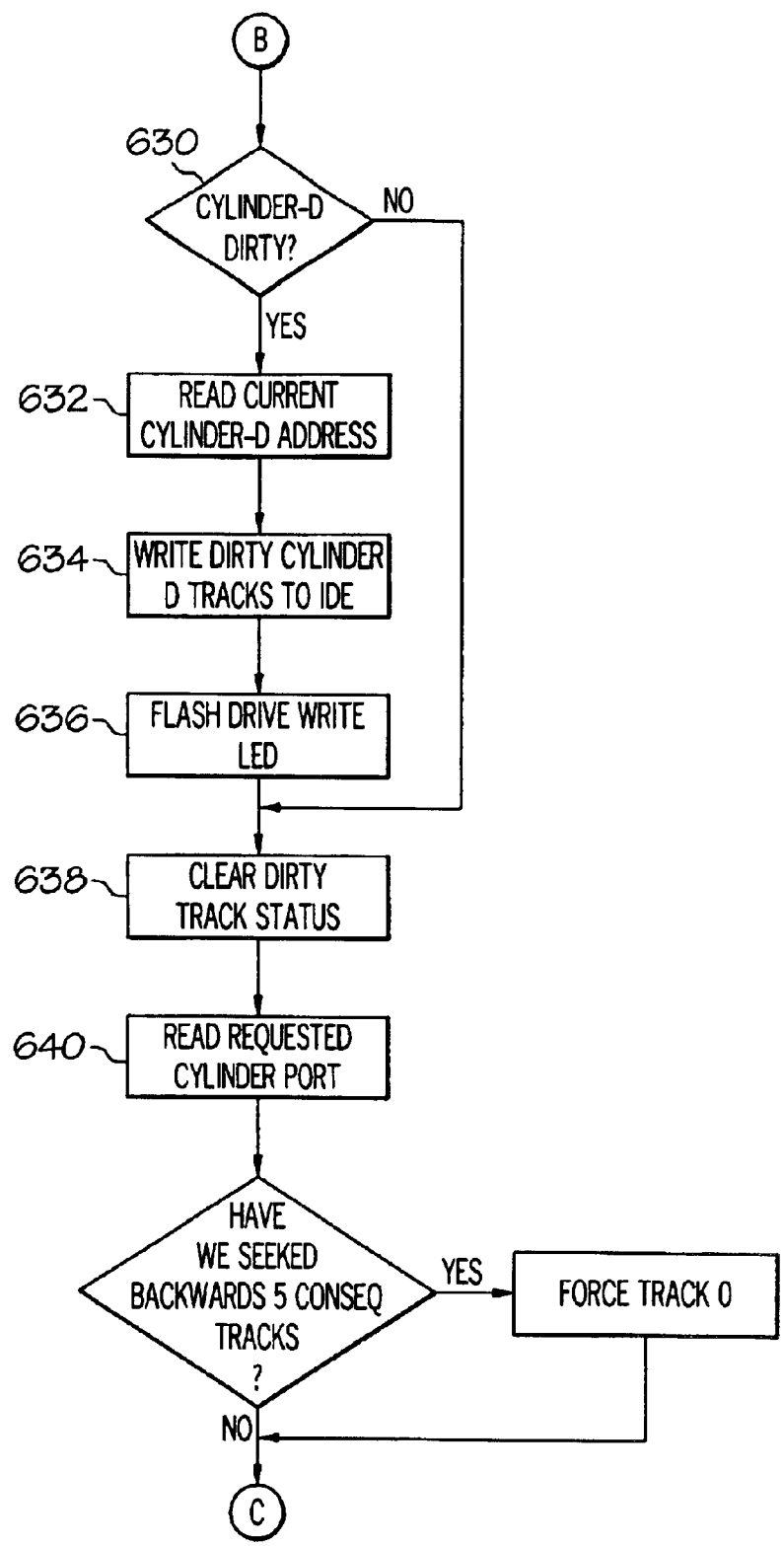
Figure 6C:
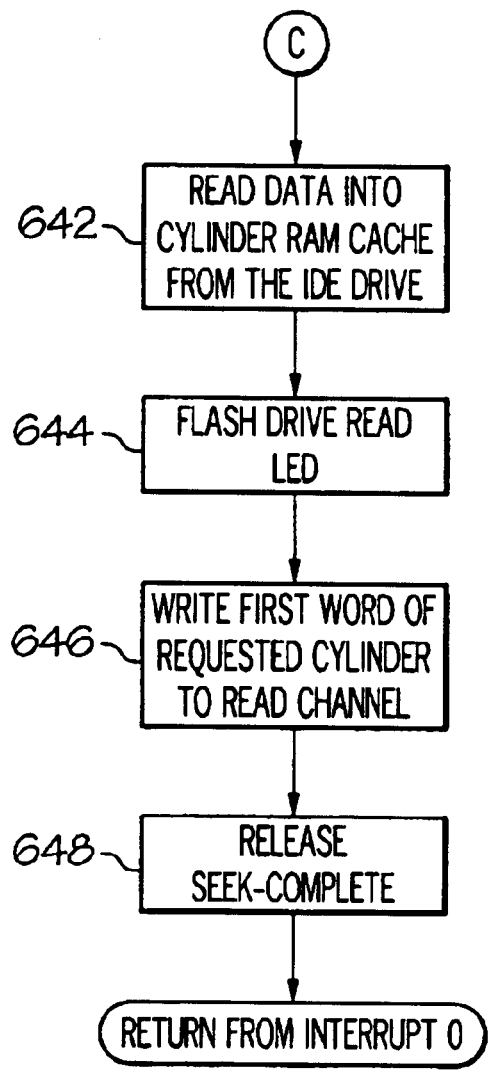

Referring now to the exemplary embodiment shown in FIGS. 6A–6C, after unmasking the IDE drive interrupt at step 602, the seek-complete control line is held off, as shown in step 604. According to the illustrated embodiment, when reading the requested cylinder data to cylinder RAM 28, processor 22 overwrites the oldest/least used cylinder block/page in the cylinder RAM. For example, processor 22 can determine which block in cylinder RAM 28 is oldest by inspecting a cache status latch or port associated with management module 32, and can set a pointer to the respective corresponding data address. Processor 22 can then read a write status word from a track dirty status register provided by management module 32 to determine which tracks within the oldest cache block have been modified in cylinder RAM 28, but not modified on drive 40 (i.e. which tracks are "dirty"), as shown in step 606. Processor 22 then writes these dirty tracks to drive 40.

According to the illustrated embodiment, this write operation involves determining whether any of the cylinders are dirty, as shown in steps 608, 614, 622, and 630. If a cylinder is dirty, the respective current cylinder address is determined (see, e.g., steps 616, 624, and 632) and the respective dirty cylinder tracks are written to drive 40 (see, e.g., steps 610, 618, 626, and 634). At such a write operation, a drive write light emitting diode (LED) can also be flashed, as shown in steps 612, 620, 628, and 636.

After writing all such dirty cylinder tracks, the dirty track status is cleared, as shown in step 638, and processor 22 can read the requested cylinder port to get the address of the cylinder data being requested by system 20, as further shown in step 640. The illustrated steps of forcing track 0 after seeking backwards five consecutive tracks are utilized merely as a bug fix related to a particular type of system software used with one embodiment of the present invention.

Referring now to step 642, the requested cylinder data is read from drive 40 and written to the oldest cache block. At this point, a drive read LED can be flashed, as depicted in step 644. As shown in step 646, once the data is in cache 28, the first word of the requested cylinder is written to read channel block 80 (see below). The seek-complete control line is then released, as shown in step 648, and the interrupt expires.

Figure 7:
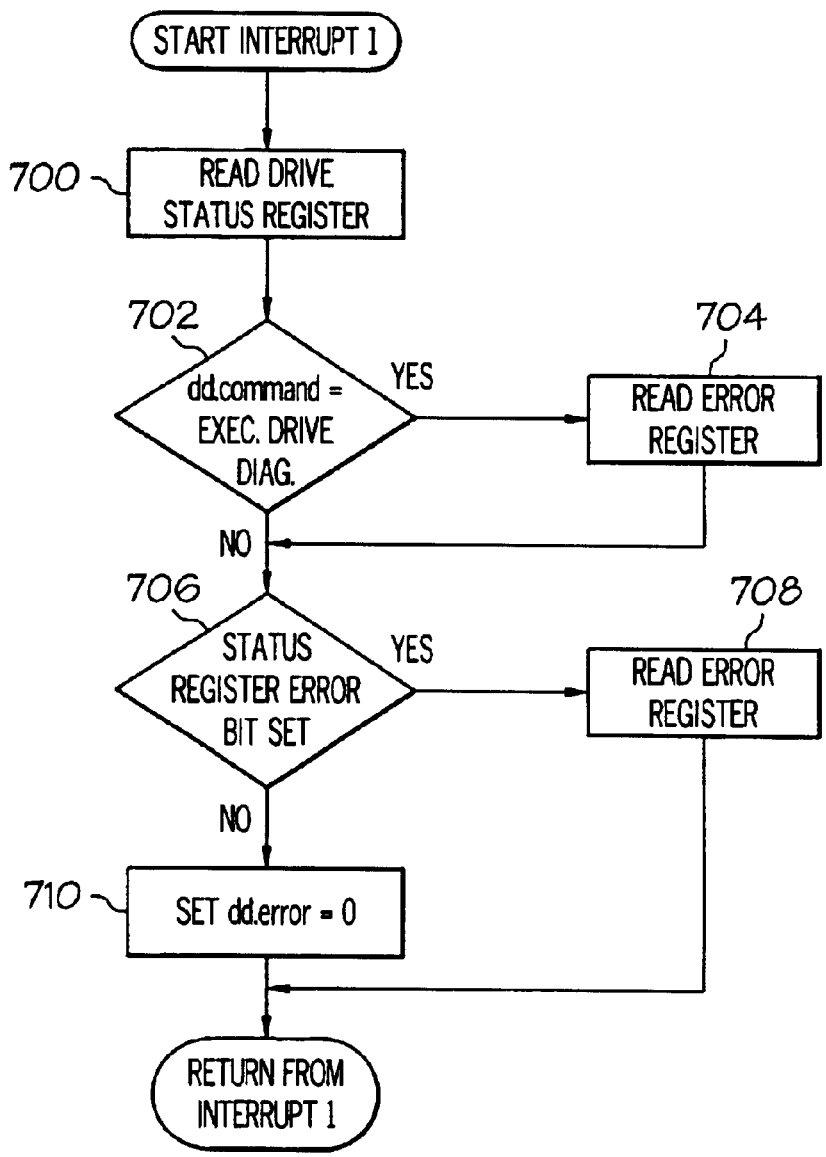
FIG. 7 is an illustration of a flowchart describing another interrupt subroutine according to an embodiment of the present invention.

In addition, a second interrupt request line INT1 associated with processor 22 can be in electrical communication with, for example, a host interrupt request line of the drive (e.g., WINTRQ of drive 40). As shown in FIG. 7, this interrupt, referred to hereinafter as the drive interrupt, can be used to inform processor 22 that drive 40 has completed a requested operation. For example, the drive status register can be read as shown in step 700. The drive interrupt can also be used to initiate diagnostics on drive 40, such as to check for any errors with the drive and/or its operation, as shown in steps 702, 704, 706, 708, and 710. For example, after the drive status register is read as shown in step 700, the processor 22 determines if a drive diagnostic command has been issued as shown in step 702. If the drive diagnostic command has been issued, the processor 22 reads the error register as shown in step 704. The processor 22 determines if the register error bit is set as shown in step 706. If the register error bit set is set, the processor 22 reads the error register as shown in step 708. If the processor 22 determines the register error bit is not set, the processor sets "dd.error" equal to zero as shown in step 710.

When system 20 starts a write cycle, for example, some of the contents in cylinder RAM 28 are modified. For example, during a write operation, interface module 30 can be outputting an MFM read data stream according to the currently requested track location until system 20 determines that the proper sector's data field is just passing under the "simulated" head. System 20 can then slam the write-gate signal, causing the interface module 30 to overlay the relevant MFM data at the proper location in cylinder RAM 28.

In the case of such write operations, according to one embodiment, the involved data is written to drive 40 during a time frame that is convenient for processor 22. For example, processor 22 can monitor when system 20 desires access to drive 40, such as by monitoring when a signal asserted on a respective drive select line associated with the system (e.g., Drive Select 0) is removed (indicating the system does not need to access drive 40,—e.g., when a write cycle has terminated). According to such an embodiment, a third interrupt request line, INT2, can be placed in electrical communication with the respective drive select line associated with system 20. When the drive select line indicates that system 20 does not need to access drive 40, a third interrupt subroutine, such as that depicted in FIG. 8, and referred to hereinafter as the drive not selected interrupt, can be initiated.

In general, upon initiation of the drive not selected interrupt, system 20 can be detained (e.g., by de-asserting the seek-complete signal). Processor 22 can then be instructed to inspect the track dirty status register of management module 32 to identify a write status word that determines which blocks/tracks in cylinder RAM 28 are dirty. Dirty tracks can then be written to drive 40 while system 20 is not requesting access to interface module 30. The track status can then be "cleaned," and the system released.

Figure 8A:
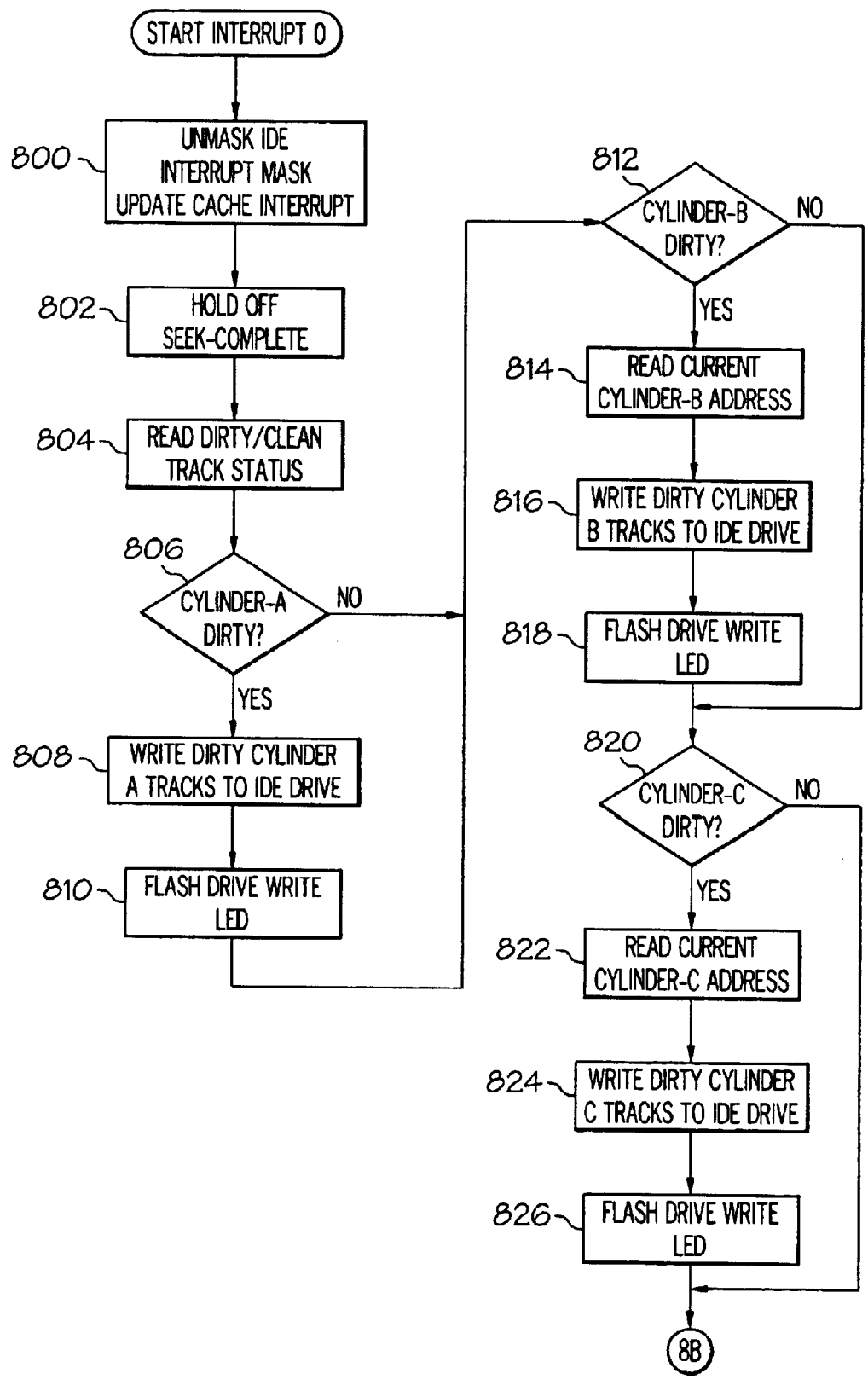
FIGS. 8A–8B illustrate a flowchart describing an interrupt subroutine according to one embodiment of the present invention.
Figure 8B:
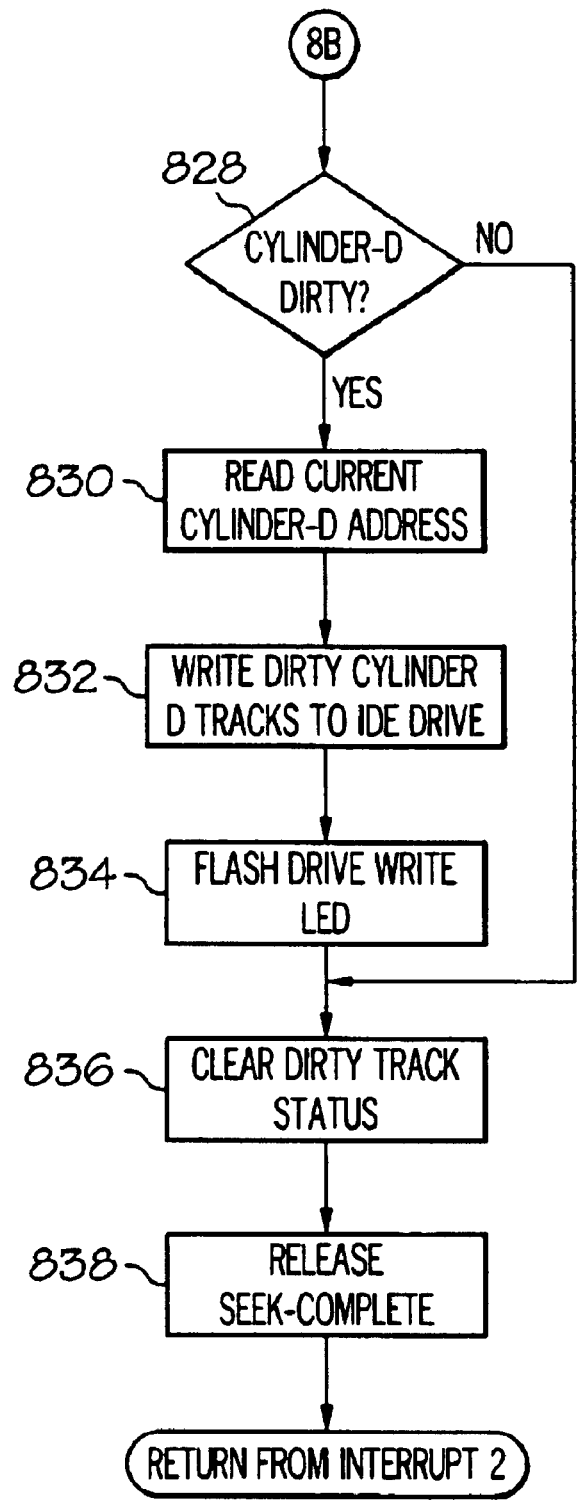

For example, as shown in the exemplary embodiment depicted in FIGS. 8A–8B, after unmasking the IDE drive interrupt and masking the update cache interrupt at step 800, the seek-complete control line is held off, as shown in step 802. According to the illustrated embodiment, processor 22 reads a write status word from a track dirty status register provided by management module 32 to determine which tracks within the oldest cache block have been modified in cylinder RAM 28, but not modified on drive 40 (i.e. which tracks are "dirty"), as shown in step 804. Processor 22 then writes these dirty tracks to drive 40.

According to the illustrated embodiment, this write operation involves determining whether any of the cylinders are dirty, as shown in steps 806, 812, 820, and 828. If a cylinder is dirty, the respective current cylinder address is determined (see, e.g., steps 814, 822, 830) and the respective dirty cylinder tracks are written to drive 40 (see, e.g., steps 808, 816, 824, and 832). At such a write operation, a drive write LED can also be flashed, as shown in steps 810, 818, 826 and 834. After writing all such dirty cylinder tracks, the dirty track status is cleared, as shown in step 836, and the seek-complete control line is released, as shown in step 838.

In terms of priority among the interrupts described in the aforementioned illustrated embodiment, the drive interrupt can be given the highest priority. The next highest priority is given to the update cache interrupt. Meanwhile, the third highest priority is given to the drive not selected interrupt.

Although, as can be understood by one of ordinary skill in the art, management module 32 can be, for example, implemented in software, or by using discrete logic (e.g., transistor-transistor logic (TTL), complementary metal-oxide semiconductor (CMOS), etc.) or custom/semi-custom devices (e.g., application-specific integrated circuits or ASICs), and can comprise a single component or a plurality of components, the management module of the illustrated embodiment comprises a single programmable logic device ("PLD"), such as a field programmable gate array ("FPGA"). A PLD from the Flex® 10K family of devices offered by Altera Corporation of San Jose, Calif., such as the Flex® 10K20, can be used to form management module 32. As can be understood by one of ordinary skill in the art, one advantage of using a Flex® 10K20 PLD can include the utilization of embedded array blocks (EABs), which can be ideal for RAM, ROM, and first in, first out ("FIFO") functions.

When embodied in hardware, management module 32 can comprise the majority of the circuitry of interface module 30. One advantage of using a PLD can be that the part count associated with interface module 30 is minimized because of the high-density logic integration, thereby offering a significant savings on chip board real-estate. Moreover, using a PLD offers the ability to adjust to future engineering changes.

Figure 9:
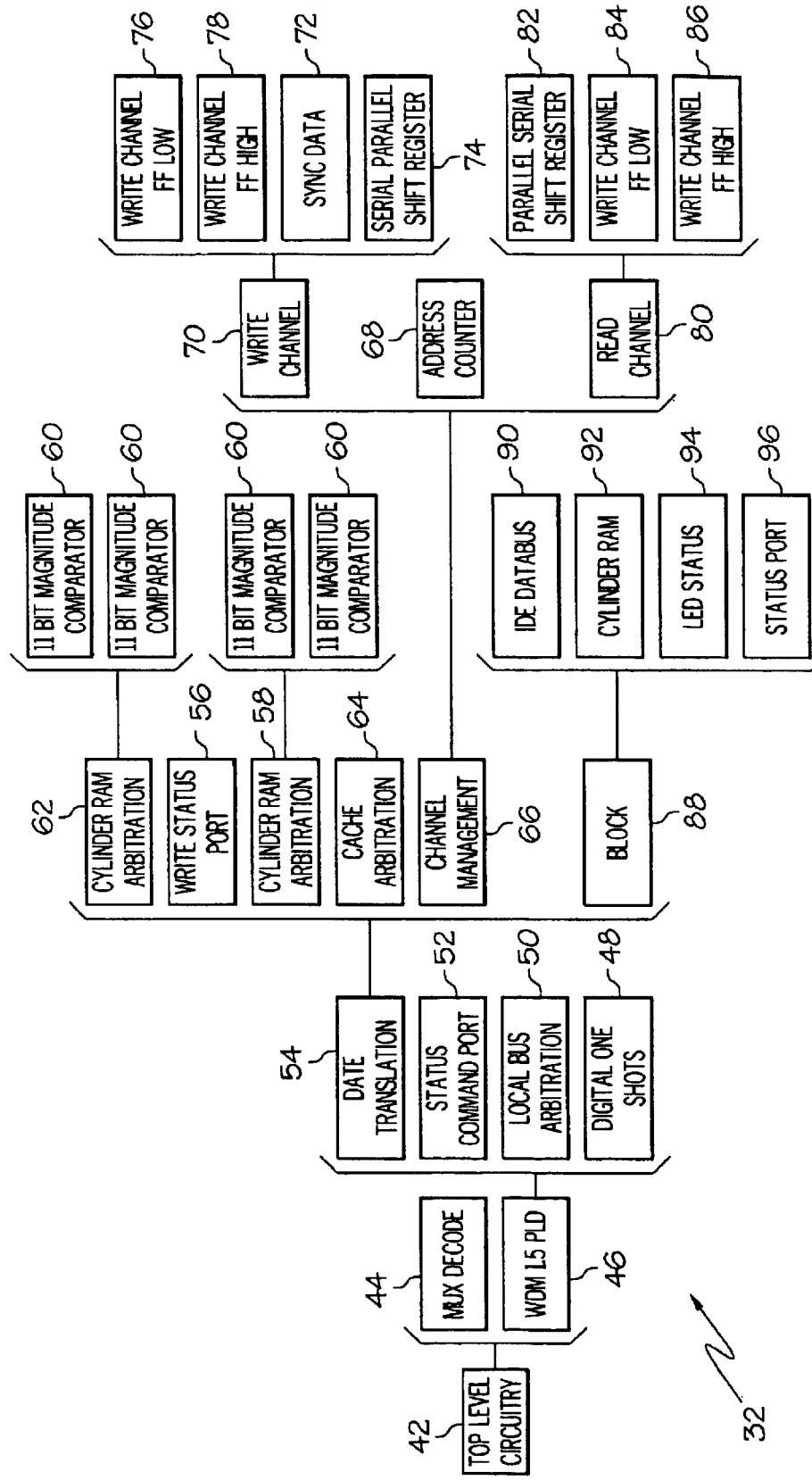
FIG. 9 is a block diagram of a management module according to an embodiment of the present invention.

According to an exemplary embodiment of the present invention, although management module 32 need not necessarily comprise each of them and could comprise different combinations of them, it comprises the design blocks depicted in FIG. 9, which one of ordinary skill in the art could implement in, for example, a PLD or software module. In particular, in a hierarchial design, top-level block 42 can be utilized to bring the entire project together For example, top-level block 42 can allow interface module 30, and specifically management module 32, to interface with other components. For example, top-level block 42 can include all buses associated with processor 22, memory 24 and drive 40.

Meanwhile, a mux-decode block 44 can be used to steer data to and/or from appropriate ports in interface module 30. For example, mux-decode block 44 can be used to determine which channel (e.g., Cylinder Y RAM Select, Cylinder X RAM Select, Track Dirty Status Register, Cylinder B Address, Requested Cylinder Port, Read Status Port 1, Cylinder C Address, Cylinder D Address, Cache Status, and/or Read Status Port 2) is selected for assertion on a multiplexed processor address/data bus associated with an exemplary embodiment of the present invention. As shown in Table 1 below, mux-decode block 44 can utilize combinatorial logic to decode signal lines (e.g., processor address lines A0, A1, A2, and A3, and an address select pin IO from processor 22 that denotes input/output space is selected) and memory bank selects for cache 28 (CYL-X and CYL-Y), to determine which channel is to be selected. Accordingly, processor 22 can access the selected port.

TABLE 1

Mux Decode

| Input | | | | | | | Output | | | |
|---|---|---|---|---|---|---|---|---|---|---|
| CYL-Y | CYL-X | IO | A3 | A2 | A1 | A0 | SEL2 | SEL1 | SEL0 | CHANNEL |
| L | X | H | X | X | X | X | H | H | H | Cylinder Y RAM Select |
| X | L | H | X | X | X | X | H | H | H | Cylinder X RAM Select |
| X | X | L | L | L | L | L | L | L | L | Track Dirty Stat Register (F080) |
| X | X | L | L | L | H | L | L | L | H | Cylinder B Address (F082) |
| X | X | L | L | H | L | L | L | H | L | Requested Cylinder Port (F084) |
| X | X | L | L | H | H | L | L | H | H | Read Status Port 1 (F086) |
| X | X | L | H | L | L | L | H | L | L | Cylinder C Address (F088) |
| X | X | L | H | L | H | L | H | L | H | Cylinder D Address (F08A) |
| X | X | L | H | H | L | L | H | H | L | Cache Status (F08C) |
| X | X | L | H | H | H | L | H | H | H | Read Status Port 2 (F08E) |

According to one embodiment of the present invention, an interface module-PLD 46 can also be included that further includes and/or organizes digital-one-shots block 48, local bus arbitration block 50, status-command port block 52, and/or data-translation block 54, for example. In one embodiment of the present invention, digital-one-shots block 48 is utilized to create an index pulse and to cause a seek-complete pulse to be created, both with a fixed pulse width. The index pulse can be used to simulate the beginning of a disk revolution (typically asserted by an MFM drive after a track of data has been stepped through). Meanwhile, the seek-complete pulse can be used to simulate when a set of read/write heads in an MFM drive would have moved to the desired location (e.g., the cylinder containing the track and sector where the requested data is stored). Both of these signals can be communicated to system 20 to allow interface module 30 to emulate, for example, an MFM hard drive.

According to an exemplary embodiment, a clock frequency of 1.25 MHZ (0.8 us period) is used to set a count to 10, with an index-pulse one-shot circuit using a counter to generate an 8 us pulse. Meanwhile, a seek-complete one-shot circuit can use a counter clock frequency of 610.35 Hertz (Hz) (1.63 ms period), with the seek-complete pulse being initiated after a count of 2 (3.2 ms). As can be understood by one of ordinary skill in the art, these times were chosen to approximate the time delay (used to emulate certain types of MFM hard disks) needed to keep a cache miss from occurring during a head step operation.

As the exemplary processor 22 multiplexes its address and data bus, local-bus-arbitration block 50 is used to separate address lines from the multiplexed processor address/data bus, which can be used to communicate between interface module 30, processor 22, local RAM 26A, EPROM 26B and Cache 28 (FIG. 3). Block 50 can also provide decoding circuitry for cache 28. For example, gated latches can be used to latch address lines from the bus when an address latch enable ("ALE") signal goes active. In an exemplary embodiment, combinatorial logic is used to decode addresses in the ranges of, for example, 00000-3FFFFH and F0000H–FFFFFH. When an address does not fall within this range, it is considered as being associated with cache 28 (e.g., 40000–BFFFFH).

Referring now to status-command-port block 52, this block can operate as a command and status center. Status and command port bits according to one embodiment of the present invention are given in Table 2, and are used to communicate commands from processor 22 and to receive status updates from management module 32, system 20, and/or drive 40. A command port can reside at address 0F100H in I/O space. Similarly, a status port can reside at address 0F086H in I/O space.

TABLE 2

Status-Command Port Bits

Command Port Bits

| | |
|---|---|
| BSEL_: | This bit can be used to reset a counter corresponding to cylinder B in cache arbitration block 64. This can be done each time processor 22 detects a cylinder B access. |
| CSEL_: | This bit can be used to reset a counter corresponding to cylinder C in cache arbitration block 64. This can be done each time processor 22 detects a cylinder C access. |
| DSEL_: | This bit can be used to reset a counter corresponding to cylinder D in cache arbitration block 64. This can be done each time processor 22 detects a cylinder D access. |
| UP-CUR-CYL-B_: | This bit can be used to update the cylinder B address latch/port. This bit can also reset the B counter in cache arbitration block 64. |
| UP-CUR-CYL-C_: | This bit can be used to update the cylinder C address latch/port. This bit can also reset the C counter in cache arbitration block 64. |
| UP-CUR-CYL-D_: | This bit can be used to update the cylinder D address latch/port. This bit can also reset the D counter in cache arbitration block 64. |
| READY-CMD_: | This bit can be used to instruct system 20 that drive 40 is ready. |
| TRACK0-CMD_: | This bit can be used to instruct system 20 that interface module 30 is at "track 0." |
| WRFAULT-CMD_: | This bit can be used to instruct system 20 that a write fault condition exists. |
| WRESET-CMD_: | This bit can be used to reset drive 40. |
| RESET-CMD_: | This bit can be used to reset many of the blocks of management module 32. |
| CLEAR-DIRTY-CMD_: | This bit can be used to clear dirty track bits. |
| SEEK-COMP-CMD_: | This bit can be used to instruct system 20 that interface module 30 has finished seeking. In addition, this bit can be used to detain system 20 when processor 22 has to gain access to drive 40 or cylinder RAM 28. |

Status Port Bits

| | |
|---|---|
| WR-CYL-B_: | Polled bit that can be used to instruct processor 22 that system 20 has accessed cylinder block B. |
| WR-CYL-C_: | Polled bit that can be used to instruct processor 22 that system 20 has accessed cylinder block C. |
| WR-CYL-D_: | Polled bit that can be used to instruct processor 22 that system 20 has accessed cylinder block D. |

Data-translation block 54 can be used to organize the below-listed blocks and can incorporate combinatorial logic circuits. For example, a write status port block 56 can be used to keep track of the tracks within cylinder RAM 28 that have been written by system 20. Written tracks can be marked as "dirty" by decoding the head address (e.g., Head 0 and Head 1) from system 20 and using a signal from the system, such as write-gate, to enable the decoder. Enabling the decoder with the write-gate signal can help ensure that only write operations affect track status.

Cylinder RAM arbitration block 58 and cylinder RAM arbitration-2 block 62 can be used to determine if the requested cylinder data is in cylinder RAM 28. If the data is not in cylinder RAM 28, a processor interrupt (e.g., update cache interrupt) can be initiated. In the illustrated embodiment, block 58 is concerned with cylinder RAM bank X, while cylinder RAM arbitration-2 block 62 is concerned with cylinder RAM bank Y.

For example, when system 20 ends its search for a cylinder, the cylinder address being requested by the system can be compared with the cylinder addresses stored in cylinder RAM 28. This can be determined by comparing a step count (representing the cylinder address) with the requested cylinder address. If the requested cylinder data is in cylinder RAM 28, the data is read from cylinder RAM to system 20. If the requested cylinder is not found in cylinder RAM 28, an interrupt (e.g., an update cache interrupt) is generated, telling processor 22 to load the requested cylinder data from drive 40 to cylinder RAM 28 (as previously discussed).

Once processor 22 writes new data into the cylinder RAM block/page that contained the oldest data, it can update the current cylinder (e.g., B, C, or D) address latch or port. This port can be used to tell a magnitude comparator (such as an 11-bit magnitude comparator block 60) and/or processor 22 the cylinder address of the data stored in that area of cylinder RAM 28. As previously discussed, in one embodiment of the invention, the data stored in cylinder A is always cylinder 0 data, while the data stored in cylinders B, C, and D is variable. Moreover, a bit (e.g., track-0) can be activated when the step count has been decremented to be zero (i.e., when the cylinder count bits are zero), indicating the "simulated" heads are now located over the first cylinder on the media (e.g., simulating a situation where a MFM drive is at track 0). Furthermore, output(s) (e.g., WR-CYL-B, WR-CYL-C, and WR-CYL-D) of magnitude comparator(s) 60 can be used as chip selects to the cylinder RAM chips, thereby enabling cache 28 as appropriate.

Referring now in more detail to 11-bit magnitude comparator blocks 60, these blocks can be used to compare the requested cylinder address (e.g., from the requested cylinder address port) with the cylinder addresses of the data in the blocks of cylinder RAM 28. In one embodiment, blocks 60 comprise, for example, a simple exclusive NOR (XNOR) and 12-IN NAND circuit with gate input.

Cache arbitration block 64 can be used to keep track of the oldest and/or least used data in cylinder RAM 28. For example, three 74191 style counters can be used in one embodiment of block 64. A respective counter can be used to represent each of cylinder blocks B, C, and D. When an access is made to a block of cylinder RAM 28, indicated either by a chip select (e.g., BSEL/, CSEL/, or DSEL/) or an update by processor 22 (e.g., UP-CUR-CYL-B1, UP-CUR-CYL-C1, UP-CUR-CYL-D1), the counter corresponding to that cylinder RAM block is reset to zero.

A zero in the counter can indicate that the respective cache block was involved with the last cache hit. When a counter is reset to zero, the other counter(s) are incremented by one, with a maximum terminal count of, for example, two (when three counters are used). According to such an embodiment, the higher the count, the older the data.

Referring now to channel management block 66, this block can coordinate additional blocks, such as those involving functions to synchronize data, control write channel, control read channel, and control the address counter. In such an embodiment, system 20 can control read and write channels of interface module 30 through channel manager block 66. For example, during a write operation associated with the highlighted example involving an MFM control system and IDE hard drive, serial data from system 20 can be routed into a write channel block 70, where it is converted to parallel data. After, for example, every eighth bit, the write channel function can increment the address in an address counter, such as with address counter block 68.

Meanwhile, during a read operation associated with the highlighted example, parallel data from cylinder RAM 28 can be latched into a read channel block 80, and serially shifted out to system 20. After eight bits have been shifted out, the data at the address selected by address counter block 68 can be latched into read channel block 80. Address counter block 68 can be incremented after each eight bit block is shifted out of read channel block 80.

According to an exemplary embodiment of the present invention, address counter block 68 is used to generate a cylinder RAM address. In general, address counter block 68 is used to automatically step through memory 24 (e.g., cache 28) to simulate a track on a drive passing under read/write heads. As previously mentioned and as discussed below, an index pulse can be generated after the counter steps through one track of data (similar to a drive).

For example, an 18-bit cylinder RAM address can be generated from four 74191 counters. A 74191 counter is a 4-bit binary up/down counter with asynchronous load. According to one embodiment of the present invention, as shown in Table 3, the counters are used to determine bits 0–14, while HEAD0, 1, and 2 from system 20 are used to determine bits 15–17. An index-pulse (see previous discussion with respect to digital-one shots block 48), such as an end-of-track pulse, for example, can be generated at the end of each track block (e.g., A0–A14=22,000d), where the HEAD bits determine which track (e.g., 0, 1, 2, 3) is selected within the current cylinder RAM block. In one embodiment, only A0–A14 are automatically incremented by the read and write channels of interface module 30.

that is synchronized with the MFM serial bit stream. As the fastest frequency fundamental obtained in MFM data is understood by those of ordinary skill in the art to be about 5 MHZ (i.e., represented when a string of all zeros is encoded), using a 10 MHZ sample clock to synchronize with and lock to the MFM serial bit stream ensures faithful reproduction of the data, as can also be understood by one of ordinary skill in the art.

One advantage of ensuring faithful reproduction of data can include the ability to detect address marks that signify an invalid MFM sequence. In particular, address marks represent an illegal condition that occurs to identify an address mark field (or data mark field) in an MFM data stream. Another advantage of sampling at the aforementioned rate is that it alleviates any need to unencode, store, and/or reencode the MFM data, which can increase the complexity of a design.

The use of sync-data block 72 allows management module 32 to synchronize to serial data. Accordingly, as can be further understood, the module 32 can continually re-sync to incoming serial data streams and hold (or "dynamically lock") the sampling point to the center of each bit cell. This can also be important for faithful reproduction as the address marks increase the possible conditions within two MFM bit cells to three conditions.

Meanwhile, serial-to-parallel-shift-register block 74 can convert serial data to parallel data. Serial-to-parallel-shift-register block 74 can be made up of, for example, sixteen flip-flops, allowing the storage of sixteen bits of serial MFM data. Capability to reset the entire bank of flip-flops can also be provided. As previously discussed, in operation, parallel data from shift register 74 can be directly interfaced to cylinder RAM 28, such as through octal flip-flops in write channel block 70.

A write-chan-FF-low block 76 can comprise a low-byte latch that can be used to capture part of the parallel data from

TABLE 3

| Cylinder RAM Addressing | | | | | | | | | | | | | | | | | |
|---|---|---|---|---|---|---|---|---|---|---|---|---|---|---|---|---|---|
| HEAD2 | HEAD1 | HEAD0 | A14 | A13 | A12 | A11 | A10 | A9 | A8 | A7 | A6 | A5 | A4 | A3 | A2 | A1 | A0 |
| RA17 | RA16 | RA15 | RA14 | RA13 | RA12 | RA11 | RA10 | RA9 | RA8 | RA7 | RA6 | RA5 | RA4 | RA3 | RA2 | RA1 | RA0 |

Note:
RA = Cylinder RAM Address Bits = RAM-ADD

Write channel block 70 can transform a serial bit stream of data (e.g., of MFM data) from system 20 to a parallel data stream, which is then stored in cylinder RAM 28. For example, serial MFM write data can be shifted into the write channel by a sample clock, and stored in a serial-to-parallel shift register, such as at block 74, until a terminal count (e.g., sixteen bits) is accumulated. An up-counter can be used to count each bit shifted into the shift register.

Once the terminal count (e.g., sixteen bits) is reached, the parallel data output from shift register 74 can be latched into two octal flip-flops. From here, a series of flip-flops and gates can be used to meet any RAM write cycle timing requirements (e.g., 100 nanoseconds (ns)). In an exemplary embodiment, write channel block 70 is active when the drive-select, ready, seek-complete, and write-gate signals of system 20 are active.

Sync-data block 72 can be used to generate a sample clock and synchronize it with the serial data. For example, flip-flops can be used to generate a 10 MHZ write sample clock serial-to-parallel-shift-register 74. A reset on this latch can be used to default the output to 00h. Meanwhile, a write-chan-FF-high block 78 can comprise a high-byte latch that can be used to capture another part of the parallel data from serial-to-parallel-shift-register 74. A reset on this latch can also be used to default the output to 00h.

Read-channel block 80 can be used to transform parallel data to a serial bit stream for system 20. For example, parallel data can be clocked into flip-flops associated with read channel block 80 from cylinder RAM 28 (e.g., two bytes at a time). When control has been switched to read channel block 80 (e.g., when data for the requested track has been loaded into cache 28), processor 22 can perform an I/O write at address 0F100 H of memory 24 to "kick-start" the read channel. In one embodiment of the present invention, after reloading data to cache 28 following a cache miss, processor 22 kick-starts the channel just prior to releasing the seek-complete line.

Once started, the read channel block 80 can be "free-running". By being "free-running," read channel block 80 can repeatedly output a track worth of data, followed by a simulated index pulse, that allows interface module 30 to more closely resemble and/or emulate rotating media. The "free-running" nature of such an embodiment of read channel 80 can be initiated by processor 22 after it writes the first word of data to the read channel.

In one embodiment of the present invention, the "free-running" cylinder RAM data stream stops whenever management module 32 receives a new head position via a step pulse from system 20. Data in, for example, a shift register, can be counted bit by bit by a binary down-counter as it is shifted out of the shift register by a sample clock. Address counter block 68 can be incremented after each byte of data has been shifted out. In one embodiment of the invention, once a terminal count is reached, a register empty bit becomes active, and is used to parallel load the shift register. Read channel block 80 can be active when the ready and drive select 0 signals associated with system 20 are active, and write gate is inactive.

Parallel-to-serial-shift-register block 82 can be used as the shift register and can be used to convert, for example, 16 bits of parallel data to serial data. For example, block 82 can be made up of 16 flip-flops, and associated set and reset logic. Parallel data can be shifted into shift register block 82 one word at a time using a parallel-load line. After the parallel data has been shifted into register block 82, it can be shifted out in a serial bit stream using, for example, a 10 MHZ sample clock.

A read-chan-FF-low block 84 can comprise a low-byte latch that can be used to capture part of the parallel data from cylinder RAM 28. A reset on this latch can be used to default the output to 24h. Meanwhile, a read-chan-FF-high block 86 can comprise a high-byte latch that can be used to capture another part of the parallel data from cylinder RAM 28. A reset on this latch can be used to default the output to 95h.

Block 88 can coordinate additional blocks, such as IDE data bus block 90; Cylinder RAM block 92; LED Status block 94; and Status Port block 96. IDE data bus block 90, for example, can be used to control the transceivers that interface drive 40. In one embodiment of the invention, block 90 comprises a combinatorial circuit that can decode an IDE drive command.

Meanwhile, cylinder-RAM block 92 can be used to detect whether processor 22 is trying to access local RAM 26A, ROM 26B, or cylinder RAM 28. As can be understood by one of ordinary skill in the art, block 92 can comprise combinatorial logic to perform this function. LED-status block 94 can be used to decode addresses for a light-emitting diode ("LED") status port, for example, that can be used to identify cylinder counts and assertions of signals such as ready, seek-complete, track 0, and write fault. Block 94 can comprise an OR gate circuit that decodes a write to the LED status port. In addition, status-port block 96 can be used to control, for example, IDE chip select and command port enables. For example, block 96 can comprise combinatorial logic that decodes chip enables and address lines.

According to the illustrated embodiment, drive 40 is configured such that it emulates a drive having four heads and 45 sectors/track (such as by using the geometry translation features of the ATA specification—e.g., the Identify Drive and Initialize Drive Parameters commands, as can be understood by one of ordinary skill in the art). As can be further understood, 45 sectors/track is chosen to accommodate a track of MFM encoded data. Meanwhile, four heads are chosen to match the aforementioned exemplary cache configuration, as can also be understood.

Figure 10:
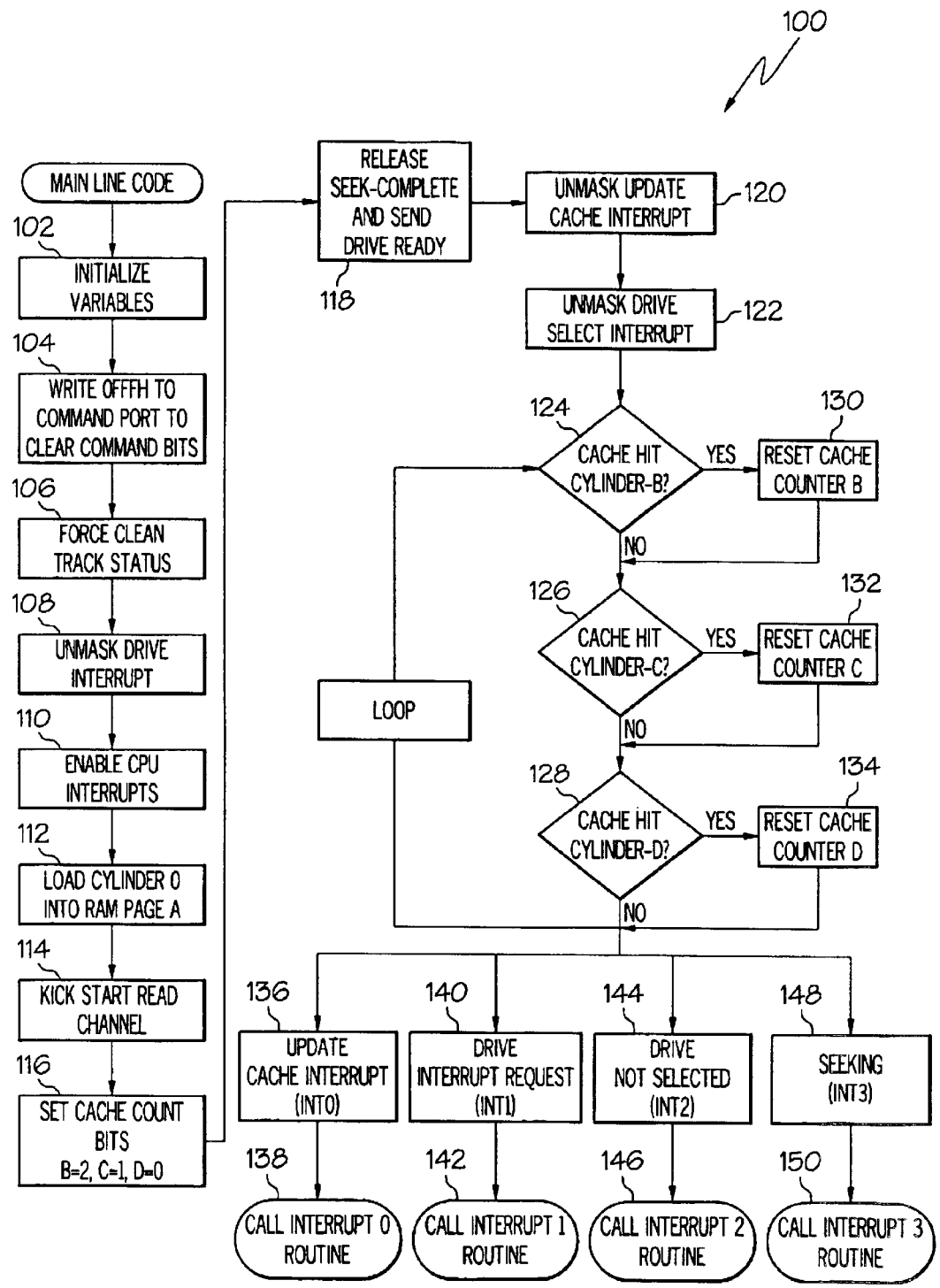
FIG. 10 is an illustration of a flowchart describing a general process of interfacing according to an embodiment of the present invention.

Referring now to FIG. 10, according to an exemplary embodiment of the present invention, module 30 interfaces system 20 with drive 40 according to the illustrated flow chart 100. In step 102, variables associated with interface module 30 are initialized. In step 104, the command bits are cleared. After forcing the status of the tracks to clean, as shown in step 106, the drive interrupt is unmasked and processor interrupts (e.g., update cache interrupt and drive select interrupt) are enabled, as shown in steps 108 and 110.

Starting with block 112, where cylinder 0 of drive 40 is loaded into cylinder RAM block A, the read channel is "kick-started," as previously discussed and shown in step 114. The count bits corresponding to cache 28 are set such that the blocks of cylinder RAM are given different orders of priority for filling, and then a seek-complete line is released and a drive-ready signal is sent to system 20, each respectively being shown in steps 116 and 118. Finally, resuming with step 120, the update cache interrupt is unmasked and, as shown in step 122, the drive select interrupt is unmasked.

When interface module 30 receives from system 20 a request for a cylinder address, the interface module inspects each cylinder for a cache hit, as shown in steps 124, 126 and 128. If there is a cache hit in a particular cylinder, the requested operation is performed (with respect to cache 28) and the cache counter is reset for that cylinder, as shown in steps 130, 132 and 134. If, during the loop, processor 22 receives an interrupt, the appropriate interrupt sub-routine is called, as shown in corresponding steps 136 and 138, steps 140 and 142, steps 144 and 146, and/or steps 148 and 150 (the seeking interrupt, INT3, is merely used for debugging in a particular embodiment of the present invention).

Figure 11A:
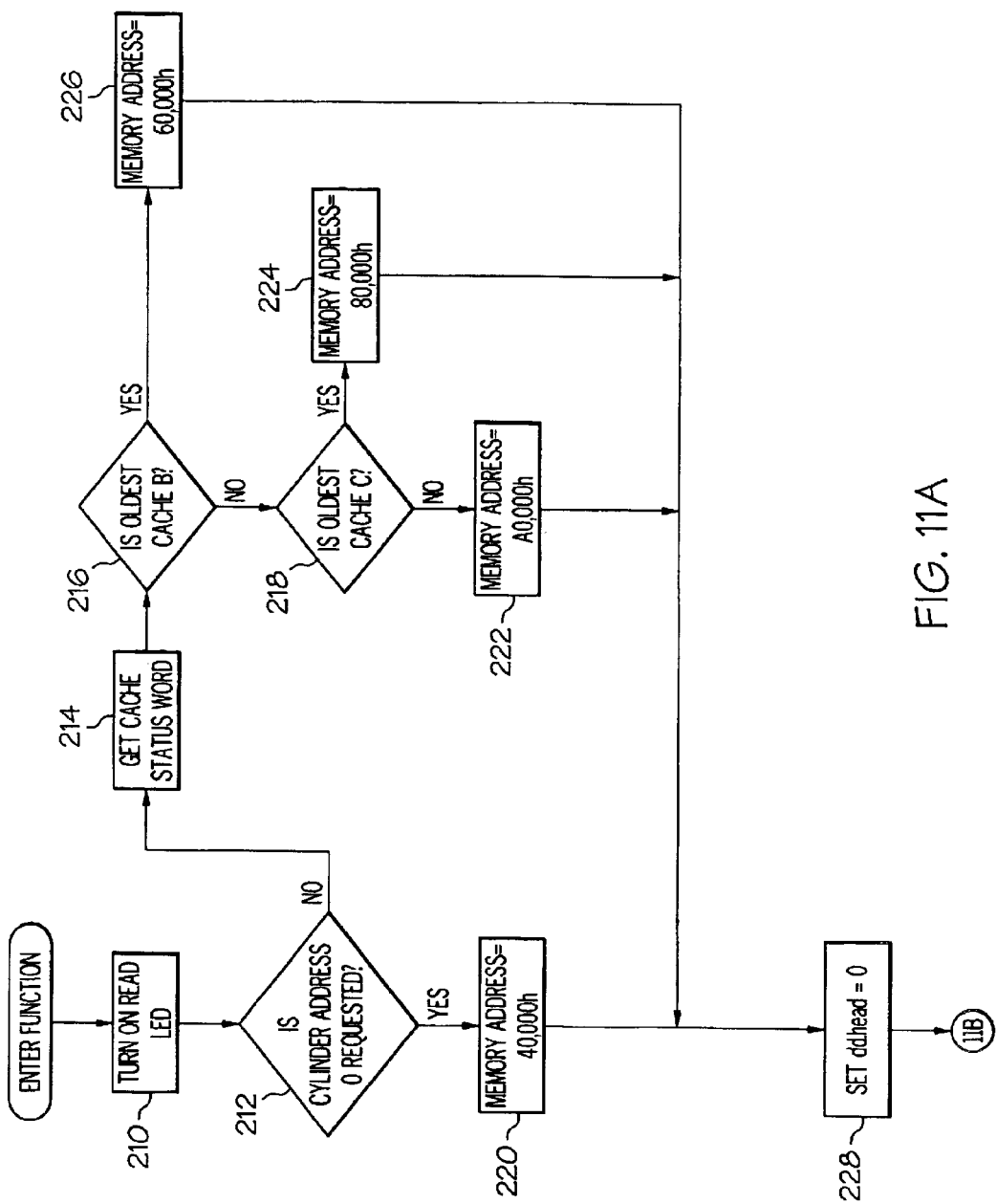
FIGS. 11A–11C illustrate a flowchart describing an interrupt subroutine according to one embodiment of the present invention.
Figure 11B:
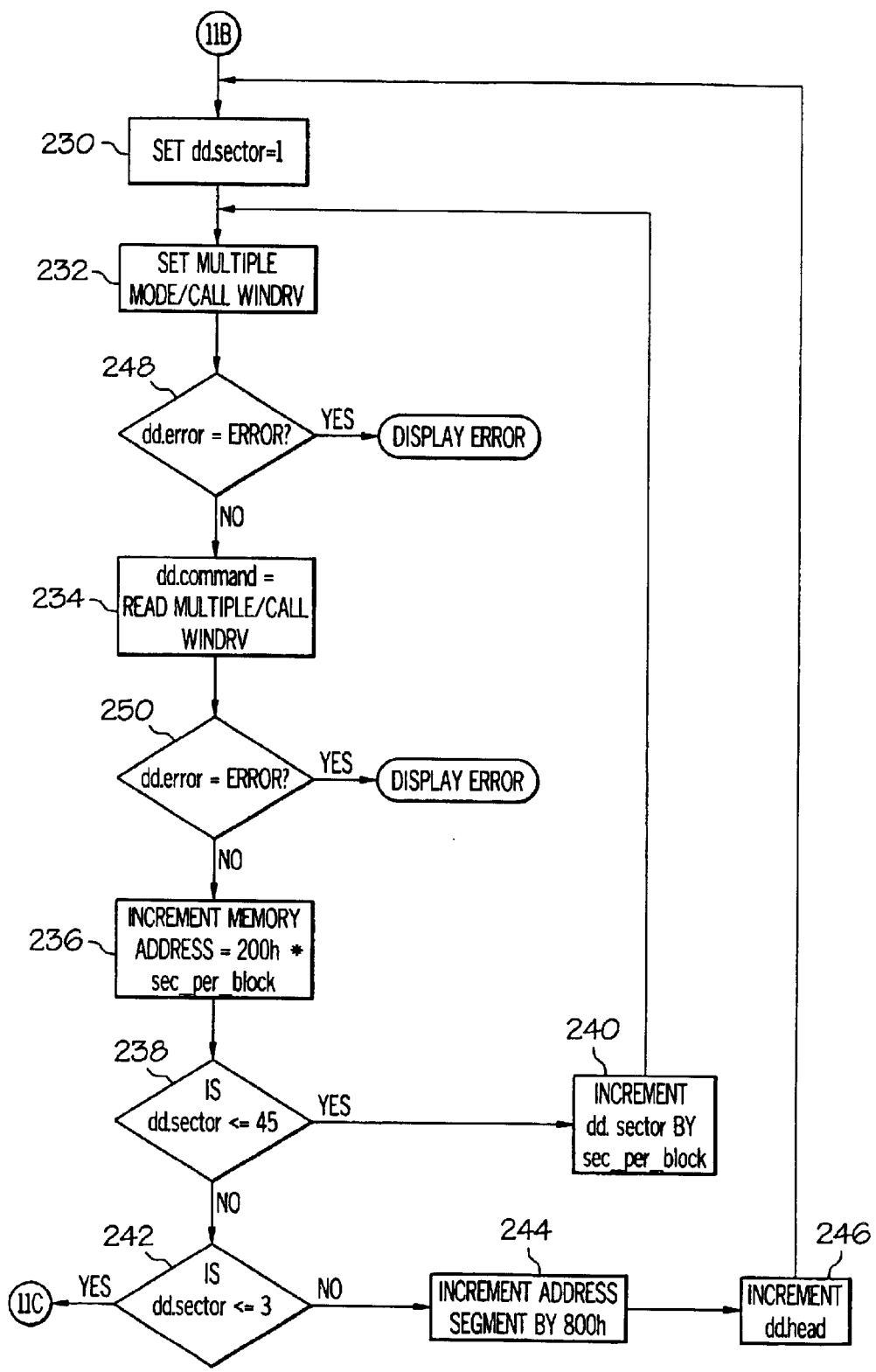
Figures 11C, 12A:
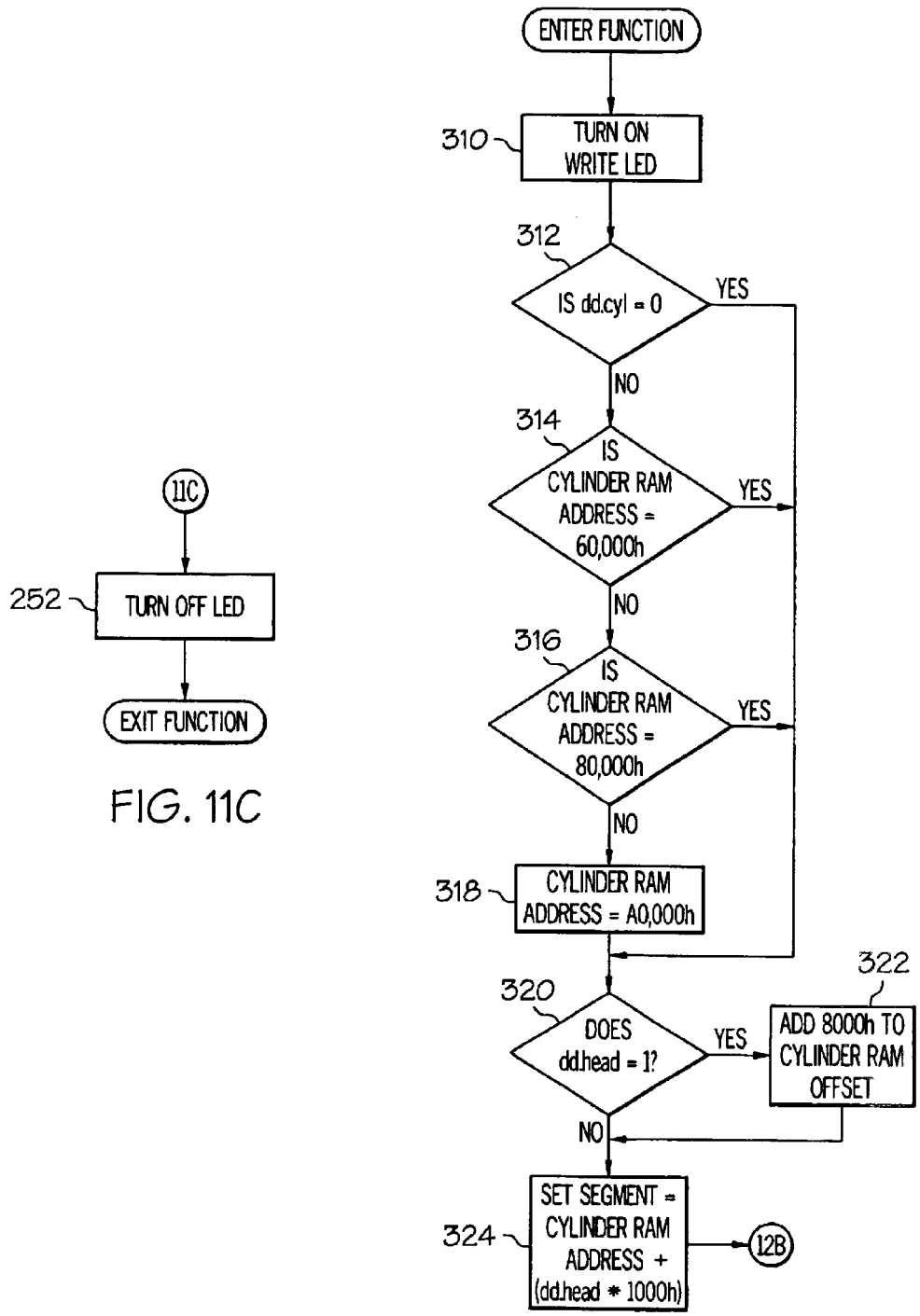
FIGS. 12A–12C illustrate a flowchart describing an interrupt subroutine according to one embodiment of the present invention.

As shown in FIGS. 11A–11C, when a cache miss has occurred the corresponding light emitting diode (e.g., a READ LED), is turned on as shown in block 210. As shown in block 212, a determination is then made if cylinder 0 is requested (i.e., if at track 0). If cylinder 0 was not requested, a determination is then made as to which cache block is oldest (e.g., B, C, or D), as shown by blocks 214, 216 and 218. Once the appropriate block is identified, the corresponding memory address is set, as shown in blocks 220, 222, 224 and 226, and the requested data is loaded into the appropriate block, as identified in steps 228–246. For example, disk drive head is set to zero (0) as shown in step 228. The disk drive sector is set to equal one (1) as shown in step 230. The Multiple Mode and Call Windrv is set as shown in step 232. A determination is performed to determine if the disk drive is in error as shown in step 248. If there is a disk drive error, the error is displayed. If there is not a disk drive error, a command for reading Multiple Mode and Call Windrv is performed. Another determination if there is a disk drive error is performed as shown in step 250. If there is not a disk drive error, a command is performed to increment memory address=200h by the number of sectors per block as shown in step 236. A determination of the sector is performed as shown in step 238. If sector is less than or equal to 45, the disk drive sector is incremented by number of sectors per block as shown in step 240. If the disk drive sector is greater than 45, a determination is performed to determine if the disk drive head is less than or equal to 3 as shown in step 242. If the disk drive head is greater than 3, address segment is incremented by 800h as shown in step 244 and the disk drive head is incremented as shown in step 246. The read routine can also includes error checking steps 248 and 250 (FIG. 11B), which can be used to switch from multi-sector mode to single sector mode and read in all undamaged sectors if an error occurs while reading in a sector. Finally, at step 252 *FIG. 11C), the READ LED can be turned off.

Figure 12B:
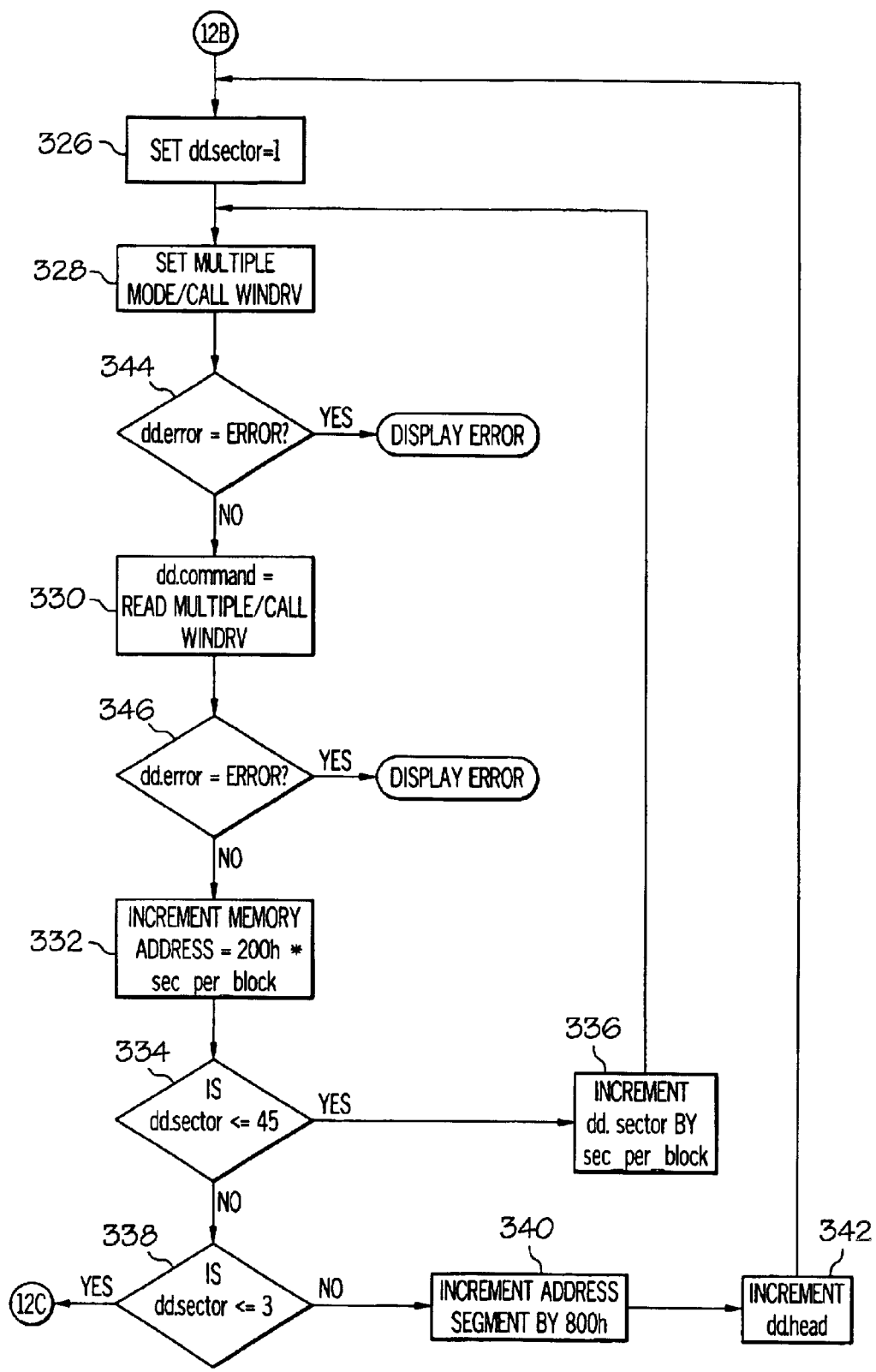
Figure 12C:
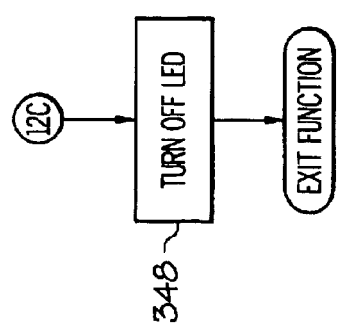

Meanwhile, with respect to a write operation, as previously discussed, such a routine is primarily invoked during a drive update interrupt and can be used to bring the IDE hard disk 40 into agreement with cache 28 during idle periods. One routine for performing the write operation is depicted in FIGS. 12A–12C. As shown in these Figures, a WRITE LED can be turned on upon initiation of this routine, as shown in block 310. As shown in steps 312–324, the appropriate cylinder RAM pointer is set. For example, a determination of the disk drive cylinder is performed as shown in step 312. If the disk drive cylinder is not equal to zero, a determination of the cylinder ram address is preformed as shown in step 314. If the cylinder ram address does not equal 60,000h, the cylinder ram address is compared against 80,000h. as shown in step 316. If the cylinder ram address does not equal 80,000h, the cylinder ram address is set to A0,000h as shown in step 318. A determination is made of the disk drive head as shown in step 320. If the disk drive head is equal to 1, 800h is added to the cylinder ram offset as shown in step 322. The segment is set to equal the cylinder ram address plus the disk drive head multiplied by 1000h. As further shown in steps 326–342, the cylinder RAM can be copied to the IDE hard disk 40. For example, the disk drive sector is set to equal one (1) as shown in step 326. The Multiple Mode and Call Windrv is set as shown in step 328. A determination is performed to determine if the disk drive is in error as shown in step 344. If there is a disk drive error, the error is displayed. If there is not a disk drive error, a command for reading Multiple Mode and Call Windrv is performed as shown in step 330. Another determination if there is a disk drive error is performed as shown in step 346. If there is not a disk drive error, a command is performed to increment memory address=200h by the number of sectors per block as shown in step 332. A determination of the disk drive sector is performed as shown in step 334. If disk drive sector is less than or equal to 45, the disk drive sector is incremented by number of sectors per block as shown in step 336. If the disk drive sector is greater than 45, a determination is performed to determine if the disk drive head is less than or equal to 3 as shown in step 338. If the disk drive head is greater than 3, address segment is incremented by 800h as shown in step 340 and the disk drive head is incremented as shown in step 342. Moreover, as with the read routine, error checking can be done, such as that shown in blocks 344 and 346 (FIG. 12B). Finally, as shown in step 348 (FIG. 12C), the WRITE LED can be turned off upon completion of the operation.

Figure 13:
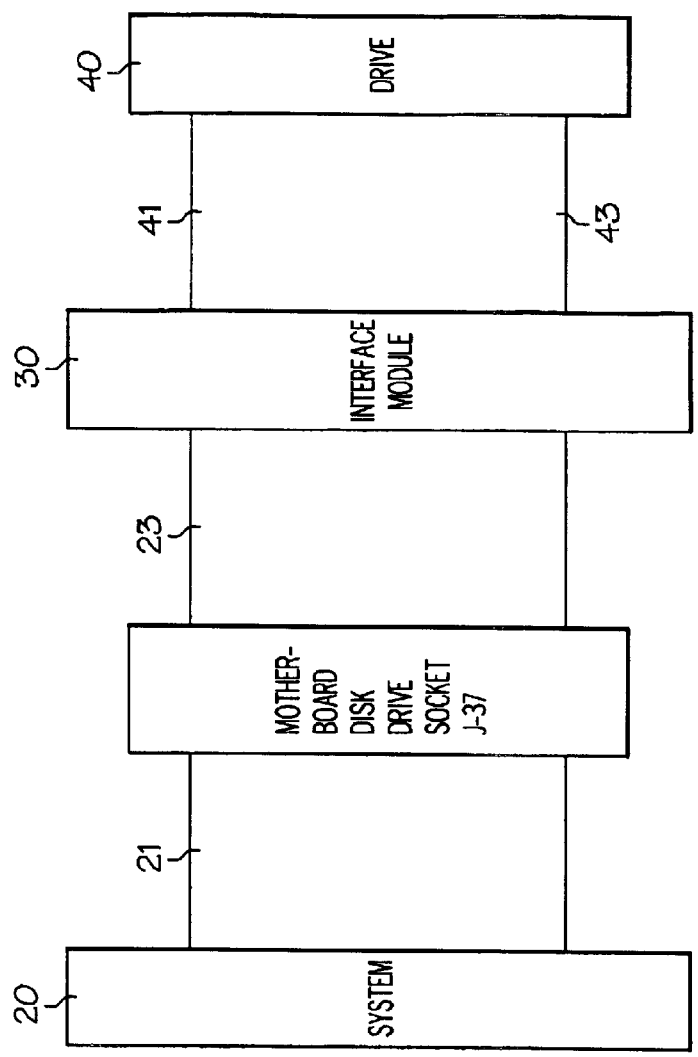
FIG. 13 is a block diagram of an interface module in use according to one embodiment of the present invention.
Figure 14:
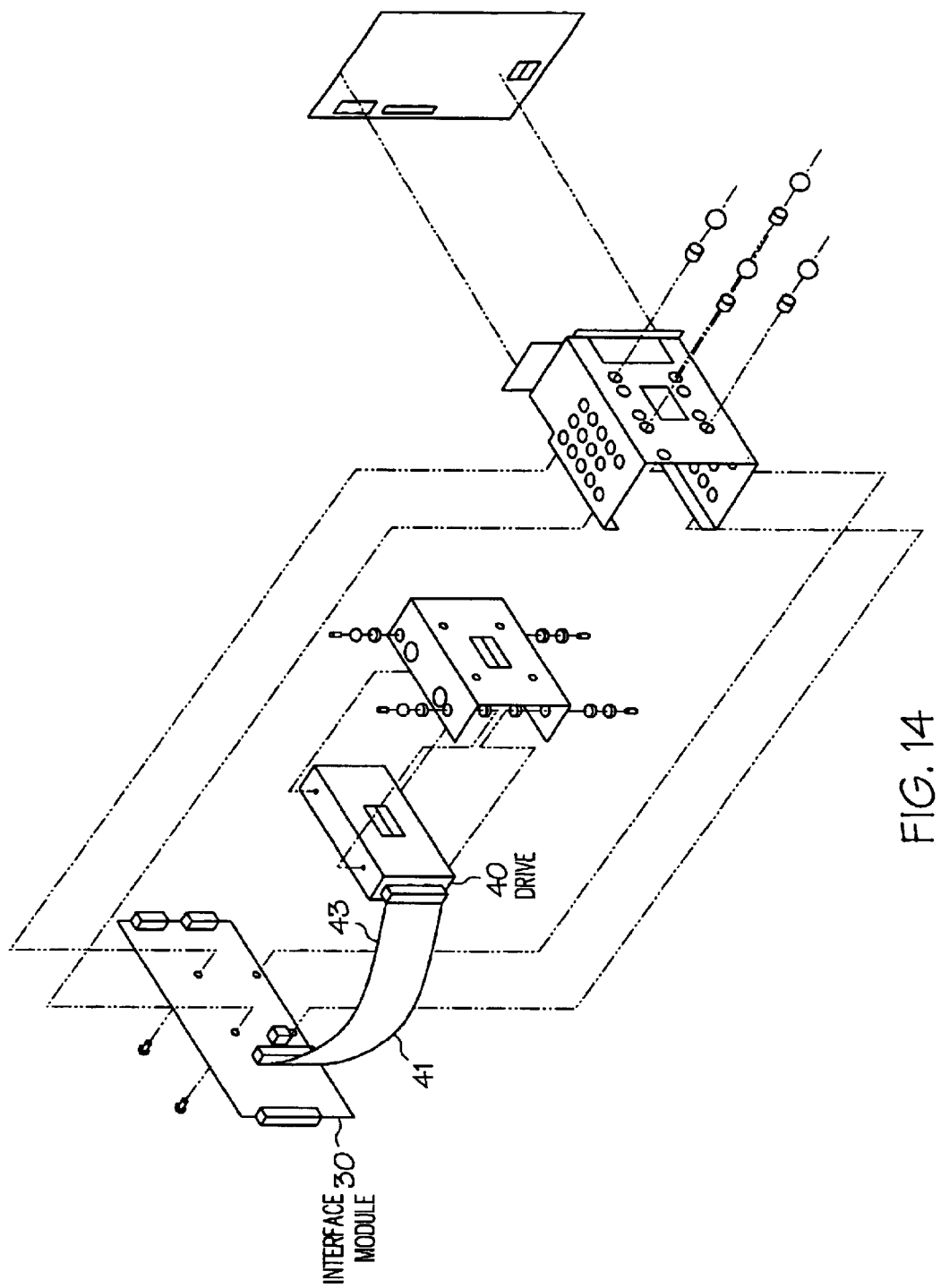
FIG. 14 is a partially exploded perspective view of an interface module according to one embodiment of the present invention, where the interface module is connected with a hard disk for use with a machine tool controller.

FIGS. 13 and 14 schematically depict an embodiment of the present invention wherein system 20 is represented by a controller for machine tools that was originally designed to communicate with an MFM hard disk 40. According to the embodiment as shown, interface module 30 can interface to controller 20 through, for example, a back-plane 21 (e.g., where the interface module is connected to the back-plane through a P55 connector 23). Meanwhile, the interface to drive 40 can be accomplished through a control and data lines connector 41, and a power connector 43, for example.

According to one embodiment of the present invention, interface module 30 is designed to mount to assembly sheet metal by following a mounting pattern, with the interface module sheet metal accommodating the industry standard mounting pattern for a 3.5" hard drive form. The design of interface module 30 can, for example, use both surface-mount and through-hole technologies.

Also according to one embodiment of the invention, interface module 30 is designed to tolerate operating temperatures from at least about 0° C. to about 65° C., and storage temperatures from at least about −40° C. to about 100° C. Humidity of about 5% to about 95% non-condensing should also be acceptable. Moreover, the rated temperature range of drive 40 should be about 5° C. to about 55° C. operating, and about −40° C. to about 60° C. non-operating.

According to an exemplary embodiment of the present invention, interface module 30 can be replaced in the field as a unit. Moreover, a cloner can be used to test interface module 30. Furthermore, an Altera® FLEX® 10K20RC240-4, packaged in a 240 pin power quad flat pack ("RQFP"), can be used as management module 32, although other similar devices can also be used.

In one embodiment of the present invention, a flexible disk interface is also controlled by system 20. Accordingly, interface module 30 can also interface a floppy drive, such as through back-plane connector 23, a data/control connector, and a power connector. Such a flexible disk drive should be compatible with the American National Standards Institute ("ANSI") 3.80-1981 specification. In addition, the form factor can be the industry-standard 3.5 inch drive.

The foregoing description of the exemplary embodiments of the present invention has been presented for purposes of illustration and description. It is not intended to be exhaustive or to limit the invention to the precise form disclosed, and modifications and variations are possible in light of the above teachings. Although a number of components, devices, and variables have been described or shown for use in the exemplary embodiments of the present invention, it is to be understood that other components, devices, and variables could be used as alternatives to those described or shown without departing from the scope of the invention.

For example, although the illustrative embodiment caches by cylinder, it is also within the scope of the present invention to cache by track, as can be understood. Moreover, although the exemplary embodiment has been described with reference to a machine tool controller and hard drive, and specifically with respect to an MFM-based machine tool controller and an IDE hard drive, other systems and components can be used with and utilize the present invention. For example, an embodiment of the present invention could also be used with an IDE-compatible FLASH card. Furthermore, as can also be understood by those of ordinary skill in the art, terms such as "interrupting" and "holding off" do not necessarily connote any particular temporal dimension, as such actions can be substantially instantaneous, and any associated temporal delay could be reduced with further developments in associated hardware, firmware, and software, for example.

Thus, it should be understood that the embodiments were chosen and described in order to best illustrate the principals of the invention and its practical application. This illustration was provided to thereby enable one of ordinary skill in the art to best utilize the invention in various embodiments and with various modifications as are suited for the particular use contemplated. Accordingly, it is intended that the scope of the invention be defined by the claims appended hereto.

We claim:

1. A method for interfacing a first component and a second component, the first component being associated with a first electrical interface and first communication type, and the second component being associated with a second electrical interface and second communication type, comprising the following steps:

receiving from the first component a request for an access operation comprising one of at least a write operation and a read operation, the request comprising a requested data address associated with the second component;

determining whether data corresponding to the requested data address is missing from memory, the memory being independent of the second component; and when the data is missing from the memory, intercepting the request, loading the data from the second component to the memory, and performing the requested access operation, wherein modified data is converted from the first communication type to the second communication type and written to the memory and to the second component during a write operation, and wherein data is converted from the second communication type to the first communication type and read by the first component during a read operation.

2. The method according to claim 1, wherein the step of determining whether data is missing from memory comprises determining whether the data is stored in an associated cache memory, and wherein the steps of intercepting the request and loading the data respectively comprise generating an interrupt request and writing the data to the associated cache memory, wherein the request for an access operation from the first component is detained in response to the interrupt request while the data is being written to the associated cache memory.

3. The method according to claim 2, wherein the step of determining whether the data is stored in an associated cache memory comprises comparing the requested data address with addresses of data currently stored in the associated cache memory.

4. The method according to claim 2, wherein the step of writing the data to the associated cache memory comprises writing the data to a portion of the associated cache memory associated with stored data that is older than stored data associated with other portions of the associated cache memory.

5. The method according to claim 4, wherein the associated cache memory comprises cylinder random access memory and wherein the step of writing the data to a portion of the associated cache memory comprises writing the data to a page in the cylinder random access memory that is older than other pages in the cylinder random access memory.

6. The method according to claim 5, wherein the step of writing the data to a page comprises the steps of:

determining which of the pages in the cylinder random access memory is oldest;

determining which tracks of data within the oldest page have been modified;

writing the tracks of data within the oldest page which have been modified to the second component;

reading the data from the second component; and writing the data to the oldest page.

7. The method according to claim 1, wherein the first communication type comprises a serial stream format and the second communication type comprises a parallel stream format.

8. The method according to claim 1, wherein during a write operation the modified data comprises a serial data stream, said method further comprising the steps of:

synchronizing a clock signal with the serial data stream;

shifting the synchronized serial data stream into a serial-to-parallel register; and shifting a parallel data stream out of the register, wherein the serial-to-parallel register converts the serial data stream to the parallel data stream.

9. The method according to claim 1, wherein during a read operation the data comprises a parallel data stream, said method further comprising:

shifting parallel data stream into a parallel-to-serial register; and shifting a serial data stream out of the register, wherein the parallel-to-serial register converts the parallel data stream to the serial data stream.

10. The method of claim 1, wherein the step of performing the requested access operation comprises performing the access operation autonomously, whereby the access operation is performed without processor intervention.

11. A computer readable medium, comprising instructions capable of performing the method of claim 1.

* * * * *